(12) United States Patent
Thomasson et al.

(10) Patent No.: US 9,333,802 B2
(45) Date of Patent: May 10, 2016

(54) DIENE RUBBER COMPOSITION FOR TIRE INCLUDING A SILICA AS A REINFORCING FILLER

(75) Inventors: Damien Thomasson, Clermont-Ferrand (FR); Emmanuelle Allain, L'Hay les Roses (FR); Julien Hernandez, Antony (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 58 days.

(21) Appl. No.: 12/921,540

(22) PCT Filed: Mar. 9, 2009

(86) PCT No.: PCT/EP2009/052736
§ 371 (c)(1),
(2), (4) Date: Mar. 6, 2011

(87) PCT Pub. No.: WO2009/112463
PCT Pub. Date: Sep. 17, 2009

(65) Prior Publication Data
US 2011/0152405 A1    Jun. 23, 2011

(30) Foreign Application Priority Data
Mar. 10, 2008    (FR) ...................................... 08 51524

(51) Int. Cl.
*B60C 1/00*    (2006.01)
*C08K 3/36*    (2006.01)
*C08K 5/548*    (2006.01)
*C08K 9/02*    (2006.01)

(52) U.S. Cl.
CPC ................. *B60C 1/0016* (2013.04); *C08K 3/36* (2013.01); *C08K 5/548* (2013.01); *C08K 9/02* (2013.01)

(58) Field of Classification Search
CPC ........................................................ B60C 1/00
USPC ................... 524/492, 493; 152/540
See application file for complete search history.

(56) References Cited

U.S. PATENT DOCUMENTS

| 7,250,463 B2 * | 7/2007 | Durel et al. ................... 524/492 |
| 2007/0208127 A1 | 9/2007 | Esch et al. |
| 2009/0221737 A1 * | 9/2009 | Guy et al. ..................... 524/493 |

FOREIGN PATENT DOCUMENTS

| EP | 1 529 802 | 5/2005 |
| WO | WO 03/016387 | 2/2003 |

\* cited by examiner

*Primary Examiner* — Nicole M Buie-Hatcher
*Assistant Examiner* — Chelsea M Christensen
(74) *Attorney, Agent, or Firm* — Cozen O'Connor

(57) ABSTRACT

A diene rubber composition for tires based on at least (i) one diene elastomer, (ii) one reinforcing inorganic filler and (iii) one coupling agent which provides the bonding between the inorganic filler and the elastomer. The inorganic filler comprises at least one silica capable of being obtained by the preparation process of the type comprising the reaction of a silicate with an acidifying agent, whereby a silica suspension is obtained, followed by the separation and the drying of this suspension. The reaction of the silicate with the acidifying agent is carried out according to the following successive stages: (i) an aqueous suspension of precipitated silica, exhibiting a pH of between 2.5 and 5.3, is brought into contact (mixing) with acidifying agent and silicate, in such a way that the pH of the reaction medium is maintained between 2.5 and 5.3, (ii) silicate is added to the reaction medium obtained, so as to increase the pH of the reaction medium up to a value of between 4.7 and 6.3.

18 Claims, 3 Drawing Sheets

_US 9,333,802 B2_

DIENE RUBBER COMPOSITION FOR TIRE INCLUDING A SILICA AS A REINFORCING FILLER

RELATED APPLICATIONS

Figure 1:
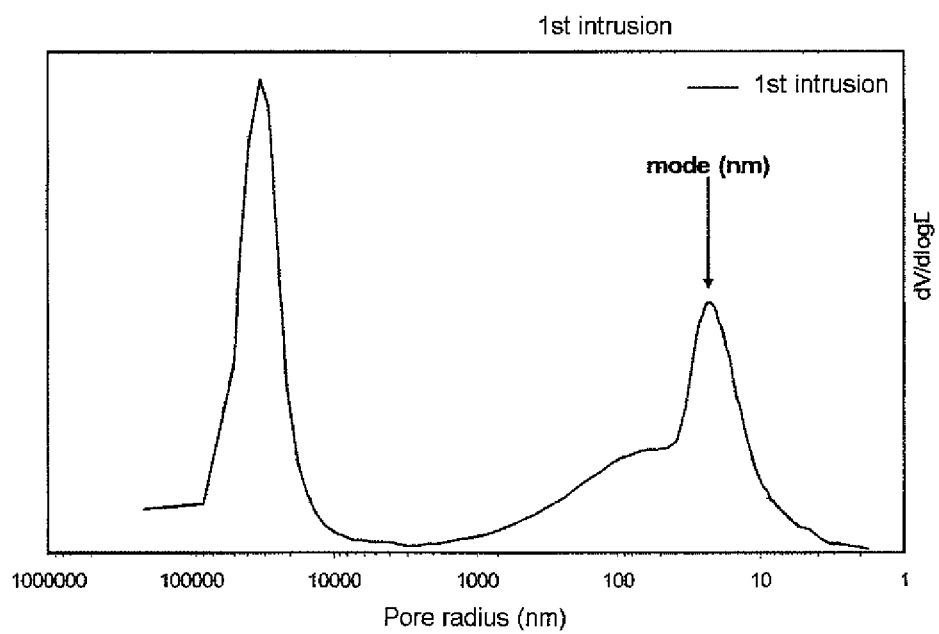

This is a U.S. national stage of application No. PCT/EP2009/052736, filed Mar. 9, 2009.

This patent application claims the priority of French patent application No. 08/51524 filed Mar. 10, 2008, the disclosure content of which is hereby incorporated by reference.

FIELD OF THE INVENTION

The present invention relates to diene rubber compositions reinforced with an inorganic filler which are intended for the manufacture of tires or of tire semi-finished products, in particular for the treads of these tires.

BACKGROUND OF THE INVENTION

It is known, in order to obtain optimum reinforcing properties conferred by a filler in a tire tread and thus a high wear resistance, and it is generally advisable for this filler to be present in the elastomer matrix in a final form which is both as finely divided as possible and as homogeneously distributed as possible. In point of fact, such conditions can only be achieved insofar as this filler exhibits a very good ability, on the one hand, to be incorporated in the matrix during the mixing of the elastomer and to deagglomerate and, on the other hand, to disperse homogeneously in this matrix.

In a known way, carbon black exhibits such abilities, which is generally not the case with inorganic fillers, in particular silicas. This is because, for reasons of reciprocal affinities, these inorganic filler particles have an unfortunate tendency, in the elastomer matrix, to agglomerate with one another. These interactions have the harmful consequence of limiting the dispersion of the filler and thus the reinforcing properties to a level substantially below that which it would be theoretically possible to achieve if all the bonds (inorganic filler/elastomer) capable of being created during the mixing operation were actually obtained; these interactions tend, moreover, to increase the consistency in the raw state of rubber compositions and thus to render their processability more difficult than in the presence of carbon black.

Ever since savings in fuel and the need to protect the environment have become a priority, it has proved necessary to produce tires having a reduced rolling resistance without having a disadvantageous effect on their wear resistance.

This has been made possible in particular by virtue of the use, in the treads of these tires, of novel rubber compositions reinforced with inorganic fillers, especially with specific silicas of the highly dispersible type, capable of competing, from a reinforcing viewpoint, with a conventional tire-grade carbon black, while giving these compositions a lower hysteresis, synonymous with a lower rolling resistance for the tires comprising them, and an improved grip on wet, snowy or icy ground.

Treads filled with such highly dispersible silicas (denoted "HD" or "HDS" for "highly dispersible" or "highly dispersible silica"), which are used in tires having a low rolling resistance sometimes described as "Green Tires" for energy saving offered to the user ("Green Tire concept"), have been extensively described. Reference will in particular be made to Patent Applications EP 501 227, EP 692 492, EP 692 493, EP 735 088, EP 767 206, EP 786 493, EP 881 252, WO99/02590, WO99/02601, WO99/02602, WO99/06480, WO00/05300 and WO00/05301.

These documents disclose use of silicas of the HD type exhibiting a BET specific surface of between 100 and 250 $m^2/g$. In practice, an HD silica having a high specific surface acting as reference in the field of "Green Tires" is in particular the silica "Zeosil 1165 MP" (BET surface equal to approximately 160 $m^2/g$), sold by Rhodia. The use of this "Zeosil 1165 MP" silica makes it possible to obtain good compromises as regards tire performance, in particular a satisfactory wear resistance and a satisfactory rolling resistance.

The advantage of using a silica having a high specific surface lies mainly in the possibility of increasing the number of bonds of the silica with the elastomer and thus of increasing the level of reinforcement of the latter. This is why it appears advantageous to use, in rubber compositions for tire treads, silicas having a high specific surface, possibly greater than that conventionally used of the order of 160 $m^2/g$, in order in particular to improve the wear resistance of these treads. Nevertheless, the dispersibility of the filler and the increase in its specific surface are regarded as contradictory characteristics. This is because a high specific surface supposes an increase in the interactions between filler items and thus a poor dispersion of the filler in the elastomer matrix and also a difficult processability.

SUMMARY OF THE INVENTION

The assignees, also referred to herein as Applicant Companies, have demonstrated, in their Patent Application WO 03/016387, that a family of highly dispersible silicas, referred to as HRS silicas, can advantageously be used in tire rubber compositions as reinforcing filler. They have continued their research and have discovered that a novel family of silicas having a high specific surface, which are defined by a specific particle size distribution, a specific porosity and/or a particular surface reactivity which depart from the range of definition of the silicas of Patent Application WO 03/016387, make it possible unexpectedly, to obtain a lowering in the hysteresis of the rubber compositions comprising them, in comparison with comprising conventional silicas with a comparable specific surface.

The silicas of this novel family are capable of being obtained by precipitation according to a novel preparation process.

The Applicant Companies have also demonstrated that this novel process for the preparation of silica makes it possible to obtain highly dispersible silicas which are particularly advantageous for use as reinforcing filler in tire rubber compositions.

Ideally, a tire tread should meet a large number of technical requirements, including a high wear resistance and a low rolling resistance, and a high grip on all ground tires, while giving the tire a good level of road performance on a motor vehicle. Thus, in a tire field, a search is underway for rubber compositions which confer the best possible compromise in tire performances.

In point of fact, the Applicant Companies have discovered, surprisingly and unexpectedly during their research studies, that the use of these novel silicas and more particularly those exhibiting a high specific surface as reinforcing fillers in the manufacture of tire treads makes it possible to achieve an excellent and surprising compromise in performance of the tire. This compromise is superior to that offered by the existing silicas having a high specific surface which are conventionally used in the treads of "Green Tires" and also to HRS silicas, and offers a level of reinforcement until now never achieved with regard to such treads. This compromise is expressed more particularly by a very significant improvement in the rolling resistance and in the wet grip without, however, harming the other technical requirements.

The term "high specific surface" is generally understood to mean surfaces of at least approximately 130 m²/g, indeed even greater than 150 m²/g.

Consequently, one aspect of the invention is a diene rubber composition for tires (that is to say, intended for the manufacture of tires or of tire semi-finished products intended for the production of these tires) based on at least (i) one diene elastomer, (ii) one reinforcement inorganic filler and (iii) one coupling agent which provides the bonding between the reinforcing filler and the elastomer, characterized in that the said inorganic filler comprises at least one silica capable of being obtained according to a specific process.

This process for the preparation of precipitated silica comprises a reaction of silicate with an acidifying agent, whereby a silica suspension is obtained, followed by a separation and a drying of the suspension, characterized in that the reaction of the silicate with the acidifying agent is carried out according to the following successive stages:
(i) an aqueous suspension of precipitated silica, exhibiting a pH of between 2.5 and 5.3, is brought into contact (mixing) with acidifying agent and silicate in such a way that the pH of the reaction medium is maintained between 2.5 and 5.3,
(ii) silicate is added to the reaction medium obtained, so as to increase the pH of the reaction medium up to a value of between 4.7 and 6.3.

According to a preferred embodiment of the process of the invention, the aqueous suspension of precipitated silica used in stage (i) is prepared in the following way:
(i) an aqueous suspension of precipitated silica, exhibiting a pH of between 2.5 and 5.3, is brought into contact (mixing) with acidifying agent and silicate in such a way that the pH of the reaction medium is maintained between 2.5 and 5.3,
(ii) an alkaline agent, preferably silicate, is added to the reaction medium obtained, so as to increase the pH of the reaction medium up to a value of between 4.7 and 6.3.

According to a preferred embodiment of the process of the invention, the aqueous suspension of precipitated silica used in stage (i) is prepared in the following way:
(1) an initial vessel heel comprising silicate and an electrolyte is formed, the concentration of silicate (expressed as $SiO_2$) in the said initial vessel heel being less than 100 g/l, in particular less than 80 g/l, and, preferably, the concentration of electrolyte in the said initial vessel heel being less than 17 g/l, in particular less than 15 g/l,
(2) acidifying agent is added to the said vessel heel until a value for the pH of the reaction medium of at least approximately 7, preferably of between 7.5 and 8.5, is obtained,
(3) acidifying agent and silicate are added simultaneously to the reaction medium,
(4) the addition of the silicate is halted while continuing the addition of the acidifying agent to the reaction medium, until a value for the pH of the reaction medium of between 2.5 and 5.3, preferably between 2.8 and 4.9, is obtained.

It has been found that the sequence of specific stages, in the process according to the embodiment described above, was an important condition for conferring, on the products obtained, their specific characteristics and properties.

These silicas are characterized in that they are formed of aggregates of primary particles (A) of silica, at the surface of which occur primary particles (B) of silica with a size smaller than that of the primary particles (A), and in that they have:
a CTAB specific surface ($S_{CTAB}$) of between 60 and 400 m²/g,
a d50 median size of aggregates, measured by XDC particle sizing after ultrasonic deagglomeration, such that:

$$d50\ (nm) > (6214/S_{CTAB}\ (m^2/g)) + 23,$$

a pore volume distribution such that:

$$V(d5\text{-}d50)/V(d5\text{-}d100) > 0.906 - (0.0013 \times S_{CTAB}\ (m^2/g)),$$
and a pore size distribution such that:

$$\text{Mode}\ (nm) > (4166/S_{CTAB}\ (m^2/g)) - 9.2.$$

More particularly, such precipitated silicas are characterized in that they exhibit a parameter C, measured by small angle X-ray scattering (SAXS), such that: $C/S_{CTAB}\ (m^2/g) > 0.001$.

Another aspect of the invention is a diene rubber composition for tires (that is to say, intended for the manufacture of tires or of semi-finished products made of rubber intended for the production of these tires) based on at least (i) one diene elastomer, (ii) one reinforcing inorganic filler and (iii) one coupling agent which provides the bonding between the reinforcing filler and the elastomer, characterized in that the said inorganic filler comprises at least one silica formed of aggregates of primary particles (A) of silica, at the surface of which occur primary particles (B) of silica with a size smaller than that of the primary particles (A), and in that it has:
a CTAB specific surface ($S_{CTAB}$) of between 60 and 400 m²/g,
a d50 median size of aggregates, measured by XDC particle sizing after ultrasonic deagglomeration, such that:

$$d50\ (nm) > (6214/S_{CTAB}\ (m^2/g)) + 23,$$

a pore volume distribution such that:

$$V(d5\text{-}d50)/V(d5\text{-}d100) > 0.906 - (0.0013 \times S_{CTAB}\ (m^2/g)),$$
and a pore size distribution such that:

$$\text{Mode}\ (nm) > (4166/S_{CTAB}\ (m^2/g)) - 9.2.$$

Another aspect of the invention is the use of a diene rubber composition in accordance with the invention in the manufacture of tires or of semi-finished products made of rubber intended for these tires, these semi-finished products being chosen in particular from the group consisting of treads, underlayers intended, for example, to be placed under these treads, crown plies, sidewalls, carcass plies, beads, protectors, air chambers and airtight internal rubbers for a tubeless tire.

The tire composition in accordance with an embodiment of the invention was particularly suited to the manufacture of treads of tires intended to equip passenger vehicles, vans, 4×4 (4-wheel drive) vehicles, caravan wheel vehicles, heavy-duty vehicles (that is to say, underground, bus, heavy road transport vehicles (lorries, tractors, trailers) or off-road vehicles), aircraft, earth moving equipment, heavy agricultural vehicles or handling vehicles, it being possible for these treads to be used during the manufacture of new tires or for the retreading of worn tires.

Another aspect of the invention is these tires and these semi-finished products made of rubber which are intended for the tires when they comprise a rubber composition in accordance with the invention, in particular tire treads, these treads surprisingly exhibiting both a reduced rolling resistance and a significantly increased wet grip.

The tire diene rubber composition according to an embodiment of the invention is capable of being prepared by a process constituting another subject-matter of the present invention. This process comprises the following stages:

the following are incorporated in a diene elastomer during a first "non-productive" stage:
as reinforcing filler, an inorganic filler;
and a coupling agent which provides the bonding between the inorganic filler and the diene elastomer;
the combined mixture is kneaded thermomechanically, in a single stage or several stages, until a maximum temperature of between 110° C. and 190° C. is reached;
the combination is cooled to a temperature of less than 100° C.;
a crosslinking or vulcanizing system is subsequently incorporated during a second "productive" stage;
the combined mixture is kneaded up to a maximum temperature of less than 110° C.,
the said process being characterized in that the inorganic filler is composed, in all or part, of a silica obtained according to the process defined above and/or exhibiting the characteristics as defined above.

The silica obtained according to the process defined above or exhibiting characteristics as defined above is used as reinforcing filler in a tire diene rubber composition (that is to say, a composition intended for the manufacture of tires or of semi-finished products made of rubber which are intended for the production of these tires).

This is why another aspect of the invention is a process for reinforcing a diene rubber composition intended for the manufacture of tires, characterized in that a reinforcing silica obtained according to the process defined above and/or exhibiting the characteristics as defined above is incorporated in this composition in the raw state by thermomechanical kneading.

The invention and its advantages will be easily understood in the light of the description and implementational examples which follow.

I Measurements and Tests Used

I.1 Characterization of the Silicas
The silicas are characterized as indicated below.
I.1.1 Specific Surface
In the account which follows, the CTAB specific surface is the external surface, which can be determined according to a method described below derived from Standard NF ISO 5794-1 (February 2006, 2nd printing 2006 March).
Principle
Silica is brought into contact with a solution of cetyltrimethylammonium (or hexadecyltrimethylammonium) bromide, commonly known as CTAB, with magnetic stirring. The layer of CTAB adsorbed is proportional to the specific surface of the silica. The silica and the residual CTAB solution are separated. The excess CTAB is titrated with a solution of di(2-ethylhexyl) sodium sulphosuccinate, commonly known as OT, up to a point of maximum turbidity.

The external surface of a silica can be determined by the amount of CTAB which it is capable of adsorbing, expressed in $m^2/g$, on product dried at 105° C. for 2 hours.
Apparatus and Equipment
Apparatus
0.45 μm syringe filters
Flasks
5000 ml volumetric flask
Magnetic bars
10 ml syringes
Equipment
Balance accurate to within 0.1 mg
Magnetic stirrers
Automatic titrater equipped i) with a photoelectric detector or with a light meter which measures the light transmission factor at the wavelength of 550 nm and ii) with a burette, for example a Mettler DL 21 titrater with a 550 nm phototrode.
Procedure
Throughout the duration of the analysis, all the devices and all the solutions must be at a temperature of between 23 and 27° C., in order to prevent the onset of crystallization, CTAB crystallizing at 20° C.
Reactants
CTAB solution with a concentration (Co) of 11 g/l, buffered at pH 9.6:
The following are weighed/introduced into a 5 liter volumetric flask containing approximately 1 liter of deionized water:
5.426 g of boric acid,
6.489 g of potassium chloride and
64.5 $cm^3$ of 1 mol/l sodium hydroxide with a burette.
The mixture is then homogenized. '55 g±0.001 g of CTAB and approximately 3 liters of deionized water are added.
Homogenization is carried out until the CTAB has completely dissolved and the volume is adjusted to 5 liters with deionized water.
Aerosol OT (di(2-ethylhexyl) sodium sulphosuccinate) solution:
Approximately 1.85 g±0.01 g of Aerosol OT are weighed out and dissolved in a one liter volumetric flask with deionized water (gentle heating is carried out in order to accelerate the dissolution with magnetic stirring).
The solution obtained is left standing for 12 days before use.
Analytical Method
Preparation of the Suspension
The following approximate amounts are weighed out exactly in a TP 50/100 flask:
1.60 g±0.05 g of silica for an expected specific surface of less than 130 $m^2/g$,
0.90 g±0.05 g of silica for an expected specific surface of between 130 and 180 $m^2/g$,
0.66 g t 0.05 g of silica for an expected specific surface of greater than 180 $m^2/g$.
90 ml (Vo) of CTAB solution are subsequently added to this weight W of silica.
Adsorption
A magnetic bar with a length equal to 35 mm (for example "double-ended" magnetic bar) is introduced into the flask, which is then stirred using magnetic stirrers (residence time of 40 minutes, stirring rate of 600 rev/min).
Filtration
A sample is removed from the suspension using a syringe. Then, after having equipped the syringe with a 0.45 μm filter, the suspension is filtered and approximately 10 ml of filtered solution are recovered in a flask.
Measurements
The automatic titrater is prepared in accordance with the instructions of the manufacturer. The titration parameters are chosen so as to obtain rapid introduction of Aerosol OT solution at the beginning of the titration and a slowing down as a function of the slope of the titration curve in the vicinity of the end point.

Blank Titration

A first titration or blank titration (titration 1) is carried out daily beforehand, before the titrating of the sample, on the starting CTAB solution, that is to say before mixing with the silica.

Approximately 5 g of starting CTAB solution are weighed out exactly and are then introduced into a flask.

54 ml of deionized water are added thereto.

Titration is carried out (Titration 1).

For this, the flask is placed in the automatic titrater and the speed of the stirrer is adjusted so as to be able to carry out the mixing without producing foam.

The titrating, which ends automatically once the point of maximum turbidity is reached, is then begun.

Each titration is carried out in duplicate.

V1 is the volume (in ml) of Aerosol OT solution obtained for the titration of the weight W1 (in g) of the starting CTAB solution used for this titration.

Titration of the Sample

Approximately 5 g of solution recovered after the filtration are weighed out exactly and are then introduced into a flask.

54 ml of deionized water are added thereto.

Titration is carried out (Titration 2).

For this, the flask is placed in an automatic titrater and the speed of the stirrer is adjusted so as to be able to carry out the mixing without producing foam.

Titration, which ends automatically once the point of maximum turbidity is reached, is then begun.

Each titration is carried out in duplicate.

V2 is the volume (in ml) of Aerosol OT solution obtained for the titration of the weight W2 (in g) of the CTAB solution recovered after the filtration and used for this titration.

Calculation

The CTAB specific surface (in $m^2/g$) is equal to:

$$578.4 \times (Vo/W) \times (100/(100-Hum)) \times (Co/1000) \times [((V1/W1)-(V2/W2))/(V1/W1)]$$

with:

Vo: volume (in ml) of starting CTAB solution (90 ml) added to the silica in order to prepare the suspension for the purpose of the titration, W: weight (in g) of silica to which the starting CTAB solution is added in order to prepare the suspension for the purpose of the titration.

Hum: humidity (or residual water content) of the silica, measured after heat treatment at 105° C. for 2 hours (as number of %), Co: initial concentration (in g/l) of the CTAB solution (11 g/l).

W1: weight (in g) of the starting CTAB solution used for Titration 1, that it to say before mixing with the silica, V1: volume (in ml) of Aerosol OT solution obtained for the titration of W1 (Titration 1), W2: weight (in g) of the CTAB solution used for Titration 2, that is to say after mixing with the silica and adsorption on the silica, V2: volume (in ml) of Aerosol OT solution obtained for the titration of W2 (Titration 2), 578.4 corresponds to the surface area (in $m^2$) occupied by 1 gram of CTAB.

The BET specific surface is determined according to a method resulting from the Brunauer—Emmett—Teller method described in "The Journal of the American Chemical Society", Vol. 60, page 309, February 1938, and corresponding to Standard NF ISO 9277 (December 1996).

I.1.2 Measurement of pH

The pH is measured according to the following method, deriving from Standard ISO 787/9 (pH of a 5% suspension in water):

Equipment calibrated pH meter (accuracy of reading to 1/100th)

combined glass electrode 200 ml beaker 100 ml measuring cylinder balance accurate to within 0.01 g.

Procedure 5 g of silica are weighed to within 0.01 g into the 200 ml beaker. 95 ml of water, measured from the graduated measuring cylinder, are subsequently added to the silica powder. The suspension thus obtained is vigorously stirred (magnetic stirring) for 10 minutes. The pH measurement is then carried out.

I.1.3 Median Size of Aggregates

The median size of aggregates, denoted d50, is measured using the XDC method of particle size analysis by centrifugal sedimentation according to the following procedure.

Apparatus Necessary

BI-XDC (Brookhaven Instrument X Disc Centrifuge) centrifugal sedimentation particle sizer, sold by Brookhaven Instrument Corporation 50 ml tall-form beaker 50 ml graduated measuring cylinder 1500 watts Branson ultrasonic probe, without tip, with a diameter of 13 mm deionized water crystallizing dish filled with ice magnetic stirrer Measurement Conditions Windows 3.54 version of the software (supplied by the manufacturer of the particle sizer)

stationary mode rotational speed: 5000 rev/min duration of the analysis: 120 minutes density (silica): 2.1 volume of the suspension to be withdrawn: 15 ml

Preparation of the Sample 3.2 g of silica and 40 ml of deionized water are added to the tall-form beaker.

The beaker containing the suspension is placed in the crystallizing dish filled with ice.

The ultrasonic probe is immersed in the beaker.

The suspension is deagglomerated for 8 minutes using the 1500 watts Branson probe (used at 60% of maximum power).

When the deagglomeration is complete, the beaker is placed on a magnetic stirrer.

The dispersion obtained is cooled to ambient temperature (21° C.)

Preparation of the Particle Sizer

The device is switched on and allowed to heat up for at least 30 minutes.

The disc is rinsed twice with deionized water.

15 ml of the sample to be analysed are introduced into the disc and stirring is begun.

The measurement conditions mentioned above are entered into the software.

The measurements are carried out.

When the measurements have been carried out:

The rotation of the disc is halted.

The disc is rinsed several times with deionized water.

The device is switched off.

Results

A record is made in the device register of the values of the 50% undersize diameter (% by weight) or median size (size for which 50% by weight of aggregates have a size below this size) and optionally the value of the Mode (the derivative of the cumulative particle size curve gives a frequency curve, the abscissa of the maximum of which (abscissa of the main population) is called the Mode).

I.1.4 Surface chemistry

The number of silanols per nm$^2$ is determined by grafting methanol to the surface of the silica. In a first step, an amount of approximately 1 g of crude silica is suspended in 10 ml of methanol in a 110 ml autoclave (Top Industrie, Ref: 09990009).

A magnetic bar is introduced and the reactor, hermetically closed and heat-insulated, is heated at 200° C. (40 bar) on a heating magnetic stirrer for 4 hours. The autoclave is subsequently cooled in a bath of cold water. The grafted silica is recovered by separating by settling and the residual methanol is evaporated under a stream of nitrogen. Finally, the grafted silica is dried at 130° C. under vacuum for 12 hours. The carbon content is determined by an elemental analyser (NCS 2500 analyser from CE Instruments) on the crude silica and on the grafted silica. This quantitive determination of carbon on the grafted silica has to be carried out in the three days which follow the end of the drying. This is because it is possible for atmospheric moisture or heat to cause hydrolysis of the methanol grafting. The number of silanols per nm$^2$ is calculated by the following formula:

$$N_{SiOH/nm^2} = \frac{(\%_{Cg} - \%_{Cb}) \times 6.023 \times 10^{23}}{S_{spe} \times 10^{18} \times 12 \times 100}$$

$N_{SiOH/nm^2}$: number of silanols per nm$^2$ (SiOH/nm$^2$)
% Cg: percentage by weight of carbon present on the grafted silica
% Cb: percentage by weight of carbon present on the crude silica
Sspe: BET specific surface of the silica (m$^2$/g)

I.1.5 Pore Volume

The pore volumes and pore diameters/radii given are measured by mercury (Hg) porosimetry using a Micromeritics Autopore IV 9520 porosimeter and are calculated by the Washburn relationship with a contact angle theta equal to 140° and a surface tension gamma equal to 485 dynes/cm; each sample is prepared as follows: each sample is dried beforehand in an oven at 200° C. for 2 hours.

$V_{(d5-d50)}$ represents the pore volume composed of the pores with diameters of between d5 and d50 and $V_{(d5-d100)}$ represents the pore volume composed of the pores with diameters of between d5 and d100, dn being in this instance the pore diameter for which n % of the total surface area of all the pores is contributed by the pores with a diameter greater than this diameter (the total surface area of the pores (S0) can be determined from the mercury intrusion curve).

The derivative of the cumulative curve (cumulative pore volume (ml/g) as a function of the pore radius (nm), FIG. 1) gives a frequency curve, the abscissa of the maximum of which (abscissa of the main population) for pores with radii of less than 100 nm is known as the Mode (in nm).

I.1.6 Median Diameter

The ability of the silicas according to the invention to disperse (and to deagglomerate) can be quantified by means of specific deagglomeration tests.

One of the deagglomeration tests is described below:

1) Principle:

The cohesion of the agglomerates is assessed by a particle size measurement (by laser diffraction) carried out on a silica suspension deagglomerated beforehand by ultrasonication; the ability of the silica to deagglomerate (splitting of objects from 0.1 to a few tens of microns) is thus measured.

2) Apparatus:

Malvern Mastersizer 2000, equipped with the hydroG standard module.

Balance with an accuracy giving 0.1 mg (for example, Mettler AE260).

Deionized water (Vibracell 75043) 750 watt Bioblock sonicator (equipped with a tip with a diameter of 13 mm), used at 80% of its nominal power.

50 ml beaker (tall form).

50 ml graduated measuring cylinder.

Crystallizing dish+ice.

3) Measurement Conditions:

The complete analytical conditions are managed manually by adjusting:
the parameters of the sampler
pump capacity: 1600 rev/min
stirrer speed: 600 rev/min
the measurement parameters:
duration of sample measurement: 10 seconds
duration of background noise measurement: 10 seconds
number of measurements: 3
the optical properties:
optical model: Fraunhofer theory
standard analysis, normal sensitivity 4) Operations to be Carried Out:

i) Preparation of the Sample

Approximately 2 g of the sample to be analysed are weighed out into the beaker placed on the pan of the balance.

50 ml of deionized water are added using the graduated measuring cylinder, the beaker containing the silica suspension is placed in the crystallizing dish containing ice, the ultrasonic probe is immersed in this suspension, only 1 cm being left between the end of the probe and the bottom of the beaker, deagglomeration is carried out for 5 minutes 30 seconds.

ii) Preparation of the Particle Sizer

Proceed in the following way in the software:

activate a file in which the measurements will be recorded (reader A, for example)

open "measure"—"manual"

open "option"—name of the particle: Fraunhofer—dispersant: water (see section 3, optical properties)

open "preparation device"—launch a cleaning cycle when the cleaning is complete, adjust the parameters of the stirrer and of the pump capacity as indicated in section 3 activate "start".

When the measurements of background noise and alignment are complete, an aliquot portion of the deagglomerated silica suspension is introduced into the vessel, so as to obtain correct observation, and the analytical cycle is continued.

When the analysis is complete, a cleaning cycle is launched.

When the cleaning is complete, the pump capacity and the stirring speed are zeroed.

The value of the median diameter $D_{50M}$ (or Malvern median diameter) which is obtained decreases as the ability exhibited by the silica to deagglomerate increases.

I.1.7 Rate of Deagglomeration α

The rate of deagglomeration, recorded as α, is measured by means of an ultrasonic deagglomeration test, at 100% power of a 600 W (watts) probe, operating in continuous mode. This known test, forming in particular the subject-matter of Patent Application WO99/28376 (see also WO99/28380, WO00/73372 and WO00/73373), makes it possible to continuously measure the change in the mean size (by volume) of particle agglomerates during a sonication, according to the following instructions.

The set-up used is composed of a laser particle sizer ("Mastersizer S" type, sold by Malvern Instruments—He—Ne laser source emitting in the red region, wavelength 632.8 nm) and of its preparation device ("Malvern Small Sample Unit MSX1"), between which has been inserted a continuous flow treatment cell (Bioblock M72410) equipped with an ultrasonic probe (600 watt Vibracell-type ½ inch sonicator, sold by Bioblock).

A small amount (150 mg) of silica to be analysed is introduced into the preparation with 160 ml of water, the device rate of circulation being set at its maximum. At least three consecutive measurements are carried out in order to determine, according to the known Fraunhofer method of calculation (Malvern 3$$D calculation matrix), the mean initial diameter (by volume) of the agglomerates, recorded as dv[0]. Sonication (continuous mode) is subsequently established at a power of 100% (i.e., 100% of the maximum position of the tip amplitude) and the change in the mean diameter by volume dv[t] as a function of the time "t" is monitored for approximately 8 minutes at the rate of one measurement every 10 seconds approximately. After an induction period (approximately 3-4 minutes), it is observed that the inverse of the mean diameter by volume $1/dv[t]$ varies linearly or substantially linearly with the time "t" (stable deagglomeration state). The rate of deagglomeration α is calculated by linear regression of the curve of change in $1/dv[t]$ as a function of the time "t" in the region of stable deagglomeration conditions (generally, between 4 and 8 minutes approximately). It is expressed in $\mu m^{-1}/min$.

The abovementioned Application WO99/28376 describes in detail a measurement device which can be used for carrying out this ultrasonic deagglomeration test. This device, it should be remembered, consists of a closed circuit in which a stream of particle agglomerates in suspension in liquid can circulate. This device essentially comprises a sample preparation device, a laser particle sizer and a treatment cell. Air bubbles which are formed during the sonication (action of the ultrasonic probe) are able to be continuously removed by bringing the sample preparation device and the treatment cell itself to atmospheric pressure.

The sample preparation device ("Malvern Small Sample Unit MSX1") is intended to receive the sample of silica to be tested (in suspension in liquid) and to cause it circulate through the circuit at the preadjusted rate (potentiometer—maximum rate of approximately 3 l/min) in the form of a liquid suspension stream. This preparation device consists simply of a receiver which comprises, and through which circulates, the suspension to be analysed. It is equipped with an adjustable-speed stirrer motor in order to prevent sedimentation of the particle agglomerates of the suspension; a centrifugal minipump is intended to provide for the circulation of the suspension in the circuit; the inlet of the preparation device is connected to the open air via an opening intended to receive the sample of filler to be tested and/or the liquid used for the suspension.

A laser particle sizer ("Mastersizer S"), the function of which is to continuously measure, at regular time intervals, the mean size by volume "dv" of the agglomerates at the passage of the stream by virtue of a measurement cell to which the automatic recording and calculating means of the particle sizer are coupled, is connected is the preparation device. It is briefly restated here that the laser particle sizers make use, in a known way, of the principle of the diffraction of light by solid objects suspended in a medium, the refractive index of which is different from that of the solid. According to the Fraunhofer theory, there exists a relationship between the size of the object and the diffraction angle of the light (the smaller the object, the greater the diffraction angle). In practice, it is sufficient to measure the amount of light diffracted for different diffraction angles in order to be able to determine the size distribution (by volume) of the sample, dv corresponding to the mean size by volume of this distribution ($dv = \Sigma(ni\, di4)/\Sigma(ni\, di3)$ with ni the number of objects of the category of or diameter di).

Finally, a treatment cell equipped with an ultrasonic probe which can operate continuously and which is intended to continuously break up the particle agglomerates at the passage of the stream is inserted between the preparation device and the laser particle sizer. This stream is thermostatically controlled via a cooling circuit positioned, at the cell, in a jacket surrounding the probe, the temperature being monitored, for example, by a temperature probe immersed in the liquid at the preparation device.

I.1.8 Morphology of the Silica by TEM

The morphology of the silica, the presence of primary particles with different sizes and the size (the diameter) of the said primary particles are illustrated/measured by Transmission Electron Microscopy (TEM), as follows.

1) Principle of the Method:

Transmission Electron Microscopy (TEM) is used in its imaging mode at magnifications ranging up to 400 000 which are appropriate for characterizing the silica primary particles.

The object of the characterization by TEM of the silicas according to an embodiment of the invention is to give access to particle size distributions, weighted by number, of the silica primary particles.

The photographs obtained by the TEM technique do not necessarily make it possible to dissociate the various primary particles by image analysis; it is up to the microscopist to identify them; the criterion used for this is the proportion of the circumference which can be recognized. It may happen that, in some regions of the aggregates, it is impossible to identify primary particles (for example in the case of excess local thicknesses of material, or else if the particles are too interpenetrated for the notion of primary particle to make sense). However, this is not an obstacle to the identification of a number of primary particles sufficiently great to obtain significant values.

The principle of the method is thus that of identifying a sufficiently high number of primary particles and of analysing their dimensions.

The primary particles of the silica according to an embodiment of the invention can be compared to spheres; the analysis of the dimensions is carried out from the TEM photograph; it consists, for each primary particle identified, in superimposing a circle which correctly reproduces the circumference of the particle and in measuring its diameter. This operation is repeated over a sufficiently high number of primary particles in order to establish a particle size distribution for these primary particles which is weighted by number. This distribution is a differential distribution. A cumulative particle size distribution of the primary particles is deduced therefrom. The descriptor chosen in order to make use of these dimensions is deduced from the cumulative particle size distribution. It is the number median diameter d50%. This is the diameter such that 50% of the primary particles counted have a diameter of less than this value and 50% of the primary particles counted have a diameter of greater than this value.

As described below, the silica according to an embodiment of the invention is formed of two families of silica primary particles, the diameters of which are different, and which are easily discernible on the photographs obtained by the TEM technique. For a given silica, the operations of identifying and counting the primary particles are thus carried out twice, a first time for the small primary particles and a second time for the large primary particles; these two operations are carried out separately and the results obtained are represented by two particle size distributions weighted by number, which are not related in any way. Due to the large differences in diameter between the small primary particles and the large primary particles, it is necessary to carry out two separate acquisitions of photographs, at two different magnifications; normal magnification values are from 150 000 to 250 000 for the particle size analysis of the large primary particles and 400 000 for the particle size analysis of the small primary particles. These values can vary according to the dimensions of the particles.

2) Procedure:

The apparatus necessary is as follows:

a) Transmission electron microscope giving access to magnifications ranging at least up to 400 000. The acceleration voltage will preferably be chosen to be equal to 120 kV.

b) Grids for TEM observation. One possibility is to prepare 200 mesh copper grids according to the following procedure:

preparation of a solution of collodion (nitrocellulose), at 0.2% as polymer, in isoamyl acetate, filling a crystallizing dish with deionized water and placing the TEM grids inside, depositing a few drops of the collodion solution at the surface of the water, evaporating the solvent, so as to prepare a collodion film at the surface of the water, withdrawing, so as to deposit the collodion film at the surface of the grids, vacuum deposition of a carbon grain with a size of between 2 and 3 nm using a device which can perform carbon coating, rendering the carbon-coated collodion surface hydrophilic, via an air plasma generated under high voltage and under controlled vacuum, using a device for rendering hydrophilic.

After this operation, the surface remains hydrophilic only for approximately 30 minutes; it is thus preferable to carry out this operation only at the last moment, once the silica suspension is ready.

The transmission electron microscope has to be correctly aligned beforehand according to the procedure supplied by its manufacturer. In addition, it has to form the subject of a verification that it is operating satisfactorily with regard to its magnification. Use is made, to this end, of a certified reference standard or material, such that the 150 000 and 400 000 magnifications are included in the range of the magnification values selected for the verification. The difference found between the distance values measured and the distance values supplied on the certificate of the reference standard or material must be at most equal to 10%.

The procedure breaks down as follows:

i) Preparation of a suspension of silica deagglomerated using ultrasound according to the protocol given for the preparation of the sample in the method for XDC particle size analysis by centrifugal sedimentation described above.

ii) Diluting this suspension in deionized water by a factor 50.

iii) Depositing a few microliters of this suspension on a hydrophilized TEM grid (less than 5 µl).

iv) Once the grid is dry, placing it on the microscope stage.

v) Introducing the microscope stage into the microscope and carrying out the usual adjustments (in particular eucentricity and objective astigmatism).

vi) As the silica is highly sensitive to electron radiation, the photographs have to be acquired over fields which have never been exposed to electrons and under conditions such that exposure of the field observed to electrons is as short as possible, including the time to take the photograph (<5 seconds). If necessary, a low dose exposure method or an equivalent is used. Great importance should be attached to the detailed observation of the field observed, in order to be certain that irradiation damage is negligible. If, despite all these precautions, irreversible damage appears on the sample, it will be necessary to envisage observation under cold conditions by means of a microscope stage cooled to the temperature of liquid nitrogen.

vii) At least approximately ten photographs are taken at a magnification of 150 000 and at least approximately ten photographs are taken at a magnification of 400 000, the object being to be guaranteed to count at least 200 small primary particles and 200 large primary particles. The area of grid effectively used for the identification and the counting of the particles must be at least 0.5 $\mu m^2$ for the small primary particles and 3.0 $\mu m^2$ for the large primary particles.

viii) It is subsequently considered that the small primary particles are the particles included within a circle with a diameter of strictly less than 10 nm and that the large primary particles are the particles included within a circle with a diameter of greater than or equal to 10 nm.

ix) As stated above, the determination of the particle size distribution of the small primary particles and the determination of the particle size distribution of the large primary particles are carried out separately, these two distributions being number-weighted. The objects identified as being primary particles are comparable to spheres and the circle which is considered in order to characterize each particle is the circle within which the particle in question is included. This operation can be carried out using software, such as, for example, ImageJ, Adobe Photoshop or Analysis.

20 particle size categories are defined between 0 and 10 nm for the small primary particles, in linear fashion (that is to say, categories with a width of 0.5 nm); 20 particle size categories are defined above 10 nm for the large primary particles, in linear fashion, so as to represent all the large primary particles identified.

The identification of the primary particles is based on the portion of their periphery which is recognizable. In the case of the large primary particles, it is considered that approximately a third of the circumference must at a minimum be recognizable in order to validate the identification. This is the case for the particles situated at the periphery of the aggregate or else for the particles exhibiting a sufficient difference in contrast to the remainder of the aggregate.

In the case of the small primary particles, it is considered that approximately half of the circumference must at a minimum be recognizable in order to validate the identification.

This is observed at the periphery of the aggregates, on the small particles visible at the surface of the large primary particles, or else in thin regions of the aggregate, for small particles exhibiting a sufficient difference in contrast with the remainder of the aggregate.

x) For each type of primary particle, large or small, the differential particle size distribution by number is determined and, from this differential distribution, the cumulative particle size distribution is determined. The latter operation can be carried out using software, such as, for example, Microsoft Excel. The number median diameter D50%, expressed in nanometers, is determined from each cumulative particle size distribution.

xi) Once these two particle size distributions are determined, it is necessary to verify that this step of characterization by TEM is well suited to the silica studied by considering, for each of the two families of particles, the envelope of the differential particle size distribution. This envelope must exhibit a maximum in the region from 0 to 10 nm for the family of the small primary particles and it must exhibit a maximum above 10 nm for the family of the large primary particles. This validates the existence of two families of particles distinct in their dimensions.

I.1.9 Morphology of the Silica by the SAXS Method

The morphology of the silica and the presence of primary particles with different sizes can also be illustrated by small angle X-ray scattering (SAXS), as follows.

1) Principle of the Method:

Small angle X-ray scattering (SAXS) consists in making use of the deviation of an incident beam of X rays of wavelength λ passing through the sample in a cone with an angle of a few degrees. A wave vector corresponds to a scattering angle θ, which wave vector is defined by the following relationship:

$$q = \frac{4\pi}{\lambda}\sin\frac{\theta}{2}$$

the unit of which is $\text{Å}^{-t}$.

A wave vector q defined in reciprocal space corresponds to each scattering angle. This wave vector corresponds to a spatial scale defined in real space and which is equivalent to $2\pi/q$. Small angle scattering thus characterizes the large distances in the sample and, conversely, large angle scattering characterizes the small distances in the sample. The technique is sensitive to the way in which the material is distributed in space.

Basic references with regard to this technique are given below:

[1] Small Angle Scattering of X rays, Guinier A., Fournet G., (1955), Wiley, New York.

[2] Small Angle X Ray Scattering, Glatter O., Krattky O., (1982), Academic Press, New York.

[3] Analysis of the Small-Angle Intensity Scattered by a Porous and Granular Medium, Spalla O., Lyonnard S., Testard F., J. Appl. Cryst. (2003), 36, 338-347.

The configuration required in order to characterize silicas by SAXS according to the criterion defined below is as follows:

SAXS set-up operating in a transmission geometry (that is to say, the incident beam passing through the sample) with an incident wavelength of between 0.5 and 2 angstroms (Å), wave vector q interval of between 0.015 $\text{Å}^{-1}$ and 0.30 $\text{Å}^{-1}$, which makes it possible to characterize distances in real space ranging from 420 to 20 Å, set-up verified in q scale using a suitable standard (for example, silver behenate, octadecanol or any other compound giving a fine SAXS line within the above q interval), one-dimensional or, preferably, two-dimensional linear detector, the set-up must make it possible to measure the transmission of the preparation, that is to say the ratio of the intensity transmitted by the sample to the incident intensity.

Such a set-up can, for example, be a laboratory set-up operating on a source of X-ray tube or else rotating anode type, preferably using the $k_\alpha$ emission of copper at 1.54 Å. The detector can be an image plate or, preferably, a gas detector. A synchrotron SAXS set-up may also be involved.

2) Procedure:

The silica sample is analysed in the pulverulent solid form. The powder is placed between two windows transparent to X rays. Independently of this preparation, an empty cell is prepared with only two transparent windows, without silica inside. The scattering by the empty cell has to be recorded separately from the scattering by the silica. During this operation, referred to as "measurement of the background", the scattered intensity originates from all the contributions external to the silica, such as the electronic background noise, the scattering by the transparent windows or the residual divergence of the incident beam.

These transparent windows must contribute a low background noise in the face of the intensity scattered by the silica over the wave vector interval investigated. They can be composed of mica, of Kapton film or, preferably, of adhesive Kapton film.

Prior to the SAXS acquisition proper on the silica, the quality of the preparation should be confirmed by means of the measurement of transmission of the cell charged with silica.

The stages to be surmounted are thus as follows:

i) Preparation of a cell composed of two windows without silica (empty cell).

ii) Preparation of a cell composed of two windows, with a sample of silica powder inside.

The amount of silica introduced must be less than 50 mg. The silica must form a layer with a thickness of less than 100 μm. The aim is preferably to obtain a monolayer of silica grains positioned on a window, which is easier to obtain with adhesive windows. The quality of the preparation is monitored by the measurement of the transmission (stage iii).

iii) Measurement of the transmission of the empty cell and of the silica cell.

The ratio R is defined in the following way:

R=transmission of the silica cell/transmission of the empty cell

R must be between 0.6 and 0.9, in order to minimize the risks of multiple scattering, while retaining a satisfactory signal to noise ratio at high q. If the value of R is too low, the amount of silica visible to the beam should be reduced; if it is too high, silica has to be added.

iv) SAXS acquisition on the empty cell and on the silica cell.

The acquisition times must be determined in such a way that the signal/noise ratio at high q is acceptable. They must be such that, in the immediate vicinity of q=0.12 $\text{Å}^{-1}$, the fluctuations in the function F(q) defined below must not exceed +/−5% with respect to the value which the function F has at this point.

v) If a two-dimensional detector was used: radial averaging of each of the two two-dimensional spectra in order to obtain the scattered intensity as a function of the wave vector q.

The determination of the scattered intensity must take into account the exposure time, the intensity of the incident beam, the transmission of the sample and the solid angle intercepted by the pixel of the detector. The determination of the wave vector must take into account the wavelength of the incident beam and the sample-detector distance.

vi) If a one-dimensional detector was used: the preceding determinations relating to the scattered intensity and the wave vector are to be carried out but there is no radial averaging to be provided.

vii) Two spectra are thus obtained in which the information is reduced to the variation in the scattered intensity as a function of the wave vector q: one spectrum for the empty cell and one spectrum for the silica cell.

viii) Subtraction of the intensity scattered by the empty cell from the intensity scattered by the silica cell (subtraction of background).

ix) The SAXS spectrum of the silica, after subtraction of background, exhibits a monotonic decrease which takes place according to conditions similar to the Porod conditions, that is to say that the intensity decreases very rapidly with the wave vector according to a law similar to a $q^{-4}$ power law. The small deviations with respect to this Porod's law are made more visible by representing the data according to the "Krattky-Porod" method. It is a question of representing F(q) as a function of q, with:

$$F(q) = I \times q^4$$

where I represents the scattered intensity after subtraction of the background and q represents the wave vector.

x) In the Krattky-Porod representation, when the spectrum is described in the direction of the increasing wave vectors, the presence of two populations of particle sizes is reflected by a first growth in the function F(q), which characterizes the larger particles, and then by a second growth in the function F(q), which characterizes the smaller particles. It may be possible to observe an oscillation in the intensity with regard to the first growth, which may be observed if the size distribution of the larger particles is relatively low.

xi) The SAXS criterion defined in the context of the present account is based on the growth of the function F between two defined wave vector limits, which are $q1=0.03$ Å$^{-1}$ and $q2=0.12$ Å$^{-1}$.

Figure 2:
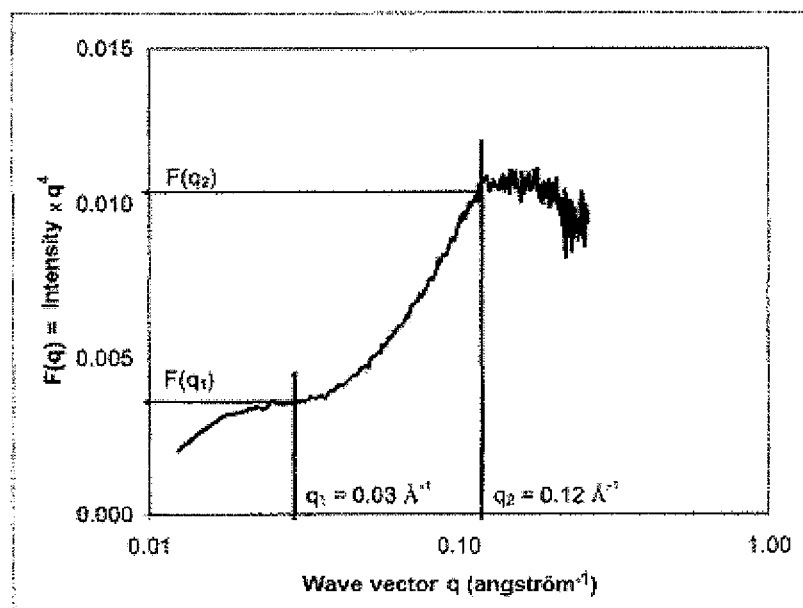

A ratio (parameter) C is defined in the following way:

$$C = [F(q2) - F(q1)] / F(q2)$$

xii) An example of an experimental result on a silica according to the invention is given in FIG. 2.

The change in $F(q) = I \times q^4$ with I=scattered intensity after subtraction of the background is plotted in this figure.

For this silica, $F(q1) = 3.6 \times 10^{-3}$ and $F(q2) = 1.07 \times 10^{-2}$ are obtained.

$C = (1.07 \times 10^{-2} - 3.6 \times 10^{-3}) / 1.07 \times 10^{-2} = 0.66$ is deduced therefrom.

I.2 Characterization of the Rubber Compositions

The diene rubber compositions are characterized, before and after curing, as indicated below.

I.2.1 Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.meter).

I.2.2 Bound Rubber

The bound rubber test makes it possible to determine the proportion of elastomer, in a nonvulcanized composition, which is associated with the reinforcing filler so intimately that this proportion of elastomer is insoluble in the normal organic solvents. The knowledge of this insoluble proportion of rubber, bonded to the reinforcing filler during the mixing, gives a quantitative indication of the reinforcing activity of the filler in the rubber composition. Such a method was described, for example, in French Standard NF T 45-114 (June 1989), applied to the determination of the level of elastomer bonded to carbon black.

This test, well known to a person skilled in the art for characterizing the quality of reinforcement contributed by the reinforcing filler, has, for example, been described in the following documents: Plastics, Rubber and Composites Processing and Applications, Vol. 25, No. 7, p. 327 (1996); Rubber Chemistry and Technology, Vol. 69, p. 325 (1996).

In the present case, the level of elastomer which cannot be extracted with toluene, after swelling the sample of rubber composition (typically 300-350 mg) in this solvent (for example 80-100 cm³ of toluene) for 15 days, followed by a stage of drying at 100° C. for 24 hours, under vacuum, before weighing the rubber composition sample thus treated, is measured. Preferably, the above swelling stage is carried out at ambient temperature (approximately 20° C.) and with the exclusion of light, and the solvent (toluene) is changed once, for example after the first five days of swelling.

The level of bound rubber (% by weight), denoted "BR", is calculated in a known way by difference between the starting weight and the final weight of the rubber composition sample, after taking into account and eliminating, from the calculation, the fraction of the components which are insoluble by nature, other than the elastomer, initially present in the rubber composition.

I.2.3 Rheometry

The measurements are carried out at 150° C. with an oscillating disc rheometer, according to Standard DIN 53529—part 3 (June 1983). The change in the rheometric torque as a function of time describes the change in the stiffening of the composition as a result of the vulcanization reaction. The measurements are processed according to Standard DIN 53529—part 2 (March 1983): ti is the induction period, that is to say the time necessary for the start of the vulcanization reaction; tα (for example t90) is the time necessary to achieve a conversion of α %, that is to say α % (for example 90%) of the difference between the minimum and maximum torques. The conversion rate constant, denoted K (expressed in min$^{-1}$), which is first order, calculated between 30% and 80% conversion, which makes it possible to assess the vulcanization kinetics, is also measured.

I.2.4 Tensile Test

These tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e., after an accommodation cycle) at 10% elongation (denoted EM10), 100% elongation (denoted EM100) and 300% elongation (denoted EM300). All these tensile measurements are carried out under the standard conditions of temperature (23±2° C.) and hygrometry (50±5% relative humidity), according to French Standard NF T 40-101 (December 1979).

I.2.5 Dynamic Properties

The dynamic properties, ΔG* and tan(δ)max, are measured on a viscosity analyser (Metravib VA4000), according to Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, under standard temperature conditions (23° C.) according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus (G*) and the loss factor, tan(δ). The maximum value of tan(δ) observed, denoted tan(δ)max, and the difference in complex modulus (ΔG*) between the values at 0.15% and 50% strain (Payne effect) are shown for the return cycle.

I.3 Characterization of the Tires or Treads

I.3.1 Rolling Resistance

The rolling resistance is measured on a test drum according to the ISO 87-67 (1992) method. A value greater than that of the control, arbitrarily set at 100, indicated improved results, that is to say a lower rolling resistance.

I.3.2 Wear Resistance

The tires are subjected to actual on-road running on a specific motor vehicle until the wear due to the running reaches the wear indicators positioned in the grooves of the tread. A value greater than that of the control, arbitrarily set at 100, indicates an improved result, that is to say a greater mileage travelled.

I.3.3 Dry or Wet Grip

The grip of the tires is determined by the measurement of braking distances in "ABS" mode on a dry ground surface or a wet ground surface. More specifically, the braking distance in "ABS" mode is measured by changing, on a dry ground surface, from a speed of 100 km/h to 0 km/h ("4 ABS" braking) and, on a wet ground surface, from a speed of 50 km/h to 10 km/h.

A value greater than that of the control, arbitrarily set at 100, indicates an improved result, that is to say an improved dry or wet grip.

II Conditions for Implementing the Invention

The tire diene rubber compositions (that is to say, intended for the manufacture of tires or of semi-finished products made of rubber intended for the preparation of these tires) in accordance with an embodiment of the invention are based on at least:
 (i) one diene elastomer;
 (ii) as reinforcing filler, one inorganic filler composed, in all or part, of a specific silica;
 (iii) one coupling agent which provides the bonding between the inorganic filler and the diene elastomer.

Of course, the expression composition "based on" should be understood as meaning a composition comprising the mixture and/or the product of in situ reaction of the various constituents used, some of these base constituents being capable of reacting or intended to react with one another, at least in part, during the various phases of manufacture of the treads and tires, in particular during their vulcanization.

In the present description, unless expressly indicated otherwise, all the percentages (%) shown are % by weight. Moreover, any interval of values denoted by the expression "between a and b" represents the range of values extending from greater than a to less than b (i.e., limits a and b excluded), whereas any interval of values denoted by the expression "from a to b" means the range of values extending from a up to b (i.e., including the strict limits a and b).

II-1. Diene Elastomer

The term "diene" elastomer or rubber should be understood as meaning, in a known way, an (one or more are understood) elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used in the compositions in accordance with the invention is understood more particularly to mean:
 (a)—any homopolymer obtained by polymerization of a conjugated diene monomer having from 4 to 12 carbon atoms;
 (b)—any copolymer obtained by copolymerization of one or more conjugated dienes with one another or with one or more vinylaromatic compounds having from 8 to 20 carbon atoms;
 (c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
 (d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1, 3-butadiene, 2,3-diethyl-1,3-butadiene, 2-methyl-3-ethyl-1, 3-butadiene or 2-methyl-3-isopropyl-1,3-butadiene, an aryl-1,3-butadiene, 1,3-pentadiene or 2,4-hexadiene. The following, for example, are suitable as vinylaromatic compounds: stirene, ortho-, meta- or para-methylstirene, the "vinyltoluene" commercial mixture, para-(tert-butyl)stirene, methoxystirenes, chlorostirenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in FR 2 740 778 or U.S. Pat. No. 6,013,718), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene/stirene copolymers and in particular those having a Tg (glass transition temperature, measured according to ASTM D3418) of between 0° C. and −70° C. and more particularly between −10° C. and −60° C., a stirene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/stirene copolymers, in particular those having a stirene content of between 5% and 50% by weight and a Tg of between −25° C. and −50° C. In the case of butadiene/stirene/isoprene copolymers, those having a stirene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/stirene/isoprene copolymer having a Tg of between −20° C. and −70° C., are suitable in particular.

To sum up, the diene elastomer of the composition in accordance with the invention is preferably chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/stirene copolymers (SBR), isoprene/butadiene copolymers (BIR), isoprene/stirene copolymers (SIR) and isoprene/butadiene/stirene copolymers (SBIR).

According to a specific embodiment, the diene elastomer is predominantly (i.e., for more than 50 phr) an SBR, whether an SER prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate stirene content, for example of between 20% and 35% by weight, or a high stirene content, for example from 35% to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the diene elastomer is predominantly (for more than 50 phr) an isoprene elastomer. This is the case in particular when the compositions of the invention are intended to constitute, in the tires, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other internal rubbers providing the interface between the abovementioned regions of the tires.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/stirene copolymers (SIR), isoprene/butadiene copolymers (BIR) or isoprene/butadiene/stirene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to another specific embodiment, in particular when it is intended for a tire sidewall or for an airtight internal rubber of a tubeless tire (or other air-impermeable component), the composition in accordance with the invention can comprise at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRS, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to another specific embodiment of the invention, the rubber composition comprises, for example, from 30 to 100 phr, in particular from 50 to 100 phr, of a high Tg elastomer as a blend with 0 to 70 phr, in particular from 0 to 50 phr, of a low Tg elastomer; according to another example, it comprises, for the whole of the 100 phr, one or more SBR(s) prepared in solution.

According to another specific embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

The compositions of the invention can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

II-2. Reinforcing Inorganic Filter

It should be remembered that the term "reinforcing inorganic filler" should be understood as meaning, in a known way, an inorganic or mineral filler, whatever its colour and its origin (natural or synthetic), also known as "white" filler or sometimes "clear" filler, in contrast to carbon black, capable or reinforcing by itself alone, without means other than an intermediate coupling agent, a diene rubber composition intended for the manufacture of tires, in other words capable of replacing, in its reinforcing role, a conventional carbon black filler of tire grade.

The tire diene rubber composition (that is to say, intended for the manufacture of tires or of semi-finished products made of rubber intended for the production of these tires) has the essential characteristic, according to a first aspect of the invention, of being reinforced by a reinforcing inorganic filler comprising, preferably predominantly, a specific silica capable of being obtained according to a process comprising the reaction of a silicate with an acidifying agent, whereby a silica suspension is obtained, followed by the separation and the drying of this suspension.

This process for the preparation of precipitated silica is characterized in that the reaction of the silicate with the acidifying agent is carried out according to the following successive stages:

(i) an aqueous suspension of precipitated silica, exhibiting a pH of between 2.5 and 5.3, is brought into contact (mixing) with acidifying agent and silicate, in such a way that the pH of the reaction medium is maintained between 2.5 and 5.3, (ii) an alkaline agent, preferably silicate, is added to the reaction medium obtained, so as to increase the pH of the reaction medium up to a value of between 4.7 and 6.3.

According to a preferred embodiment of the process of the invention, the aqueous suspension of precipitated silica used in stage (i) is prepared in the following way:

(1) an initial vessel heel comprising silicate and an electrolyte is formed, the concentration of silicate (expressed as $SiO_2$) in the said initial vessel heel being less than 100 g/l, in particular less than 80 g/l, and, preferably, the concentration of electrolyte in the said initial vessel heel being less than 17 g/l, in particular less than 15 g/l, (2) acidifying agent is added to the said vessel heel until a value of the pH of the reaction medium of at least approximately 7, preferably between 7.5 and 8.5, is obtained, (3) the acidifying agent and silicate are added simultaneously to the reaction medium, (4) the addition of a silicate is halted while continuing the addition of the acidifying agent to the reaction medium, until a value of the pH of the reaction medium of between 2.5 and 5.3, preferably between 2.8 and 4.9, is obtained.

It has thus been found that the sequence of specific stages, in the process and in particular in its preferred embodiment described above, constitutes an important condition for conferring, on the products obtained, their specific characteristics and properties.

In the process, in particular in its preferred embodiment, the choice of the acidifying agent, of the alkaline agent and of the silicate is made in a way well known per se.

Use is generally made, as acidifying agent, of a strong inorganic acid, such as sulphuric acid, nitric acid or hydrochloric acid, or of an organic acid, such as acetic acid, formic acid or carbonic acid.

The acidifying agent can be dilute or concentrated; its normality can be between 0.4 and 36 N, for example between 0.6 and 1.5 N.

In particular, in the case where the acidifying agent is sulphuric acid, its concentration can be between 40 and 180 g/l, for example between 60 and 130 g/l.

Use may furthermore be made, as silicate, of any common form of silicates, such as metasilicates, disilicates and advantageously an alkali metal silicate, in particular sodium silicate or potassium silicate.

The silicate can exhibit a concentration (expressed as $SiO_2$) of between 40 and 330 g/l, for example between 60 and 300 g/l, in particular between 60 and 260 g/l.

Generally, use is made, as acidifying agent, of sulphuric acid and, as silicate, of sodium silicate.

In the case where sodium silicate is used, the latter generally exhibits an $SiO_2/Na_2O$ ratio by weight of between 2.5 and 4, for example between 3.2 and 3.8.

The alkaline agent employed during stage (ii) can, for example, be a sodium hydroxide, potassium hydroxide or ammonia solution. Preferably, this alkaline agent is silicate, in particular silicate as used during stage (i).

As regards more particularly the preparation process of the invention, the reaction of the silicate with acidifying agent takes place in a specific way according to the following stages.

The following are brought into contact (stage (i)):

an aqueous suspension of precipitated silica (which can be a reaction slurry of precipitated silica), the said suspension exhibiting a pH of between 2.5 and 5.3, preferably between 2.8 and 4.9, for example between 2.9 and 4.5 (indeed even between 3.5 and 4.4), and acidifying agent and silicate, in such a way (in particular at flow rates such) that the pH of the reaction medium is maintained between 2.5 and 5.3, preferably between 2.8 and 4.9, for example between 2.9 and 4.5 (indeed even between 3.5 and 4.4).

The said pH of the reaction medium can vary within the range 2.5-5.3, preferably the range 2.8-4.9, for example 2.9-4.5 (indeed even 3.5-4.4), or, preferably, can remain (substantially) constant within these ranges.

In general, in this stage (i), the operation of bringing the aqueous suspension into contact with the acidifying agent and the silicate is carried out by adding acidifying agent and silicate to the aqueous suspension of precipitated silica.

According to an alternative form of the process of the invention, in stage (i), first the acidifying agent and then the silicate are added to the aqueous suspension of precipitated silica.

However, according to a preferred alternative form of the process of the invention, in stage (i), the acidifying agent and the silicate are instead added simultaneously to the aqueous suspension of precipitated silica; preferably, this simultaneous addition is carried out with regulation of the pH of the reaction medium at a value (substantially) constant within the abovementioned ranges.

The second stage (ii) of the process consists of an addition, to the reaction medium obtained on conclusion of stage (i), of an alkaline agent, preferably silicate, until a value of the pH of the reaction medium of between 4.7 and 6.3, preferably between 5.0 and 5.8, for example between 5.0 and 5.4, is reached.

This second stage can be optional (that is to say, may not be carried out) in the case where, in stage (i), an aqueous suspension of precipitated silica, exhibiting a pH of between 5.0 and 5.3, is brought into contact (mixed) with acidifying agent and silicate in such a way that the pH of the reaction medium is maintained between 5.0 and 5.3.

Preferably, the process comprises stage (ii).

Stage (ii) is usually carried out with stirring.

This is also generally the case for the whole of the reaction (stages (i) and (ii)).

The whole of the reaction is generally carried out between 75 and 97° C., preferably between 80 and 96° C.

It can be advantageous, on conclusion of stage (ii), to carry out a maturing of the reaction medium obtained, in particular the pH obtained on conclusion of this stage (ii), generally with stirring. This maturing can, for example, last from 2 to 30 minutes, in particular from 3 to 20 minutes, and can be carried out at between 75 and 97° C., preferably between 80 and 96° C., in particular at a temperature at which stage (ii) was carried out. It preferably comprises neither addition of acidifying agent nor addition of silicate.

According to the preferred embodiment of the process of the invention, the reaction of the silicate with acidifying agent is carried out according to the following successive stages:

(1) an initial vessel heel comprising silicate and an electrolyte is formed, the concentration of silicate (expressed as $SiO_2$) in the said initial vessel heel being less than 100 g/l, in particular less than 80 g/l, and, preferably, the concentration of electrolyte in the said initial vessel heel being less than 17 g/l, in particular less than 15 g/l, for example less than 14 g/l, (2) acidifying agent is added to the said vessel heel until a value of the pH of the reaction medium of at least approximately 7, preferably of between 7.5 and 8.5, for example equal to approximately 8, is obtained, (3) acidifying agent and silicate are added simultaneously to the reaction medium, in particular in such a way (in particular at flow rates such) that the pH of the reaction medium is maintained at least at approximately 7, preferably between 7.5 and 8.5, for example at approximately 8, (4) the addition of the silicate is halted while continuing the addition of the acidifying agent to the reaction medium, until a value of the pH of the reaction medium of between 2.5 and 5.3, preferably between 2.8 and 4.9, for example between 2.9 and 4.5 (indeed even between 3.5 and 4.4), is obtained, (i) the aqueous suspension (reaction medium) obtained on conclusion of stage (4) is brought into contact (mixed) with acidifying agent and silicate, in such a way that the pH of the reaction medium is maintained between 2.5 and 5.3, preferably between 2.8 and 4.9, for example between 2.9 and 4.5 (indeed even between 3.5 and 4.4), (ii) an alkaline agent, preferably silicate, is added to the reaction medium obtained, until a value of the pH of the reaction medium of between 4.7 and 6.3, preferably between 5.0 and 5.8, for example between 5.0 and 5.4, is obtained.

The term "electrolyte" is to be understood here as normally accepted, that is to say that it means any ionic or molecular substance which, when it is in solution, decomposes or dissociates to form ions or charged particles. Mention may be made, as electrolyte, of a salt of the group of the salts of alkali metals and alkaline earth metals, in particular the salt of the metal of the starting silicate and of the acidifying agent, for example sodium chloride in the case of the reaction of a sodium silicate with hydrochloric acid or, preferably, sodium sulphate in the case of the reaction of a sodium silicate with sulphuric acid.

In stage (1), the concentration of electrolyte in the initial vessel heel is greater than 0 g/l, for example greater than 8 g/l.

The simultaneous addition of stage (3) is generally carried out in such a way that the value of the pH of the reaction medium is continually equal (to within ±0.2) to that achieved on conclusion of stage (2).

It is possible, on conclusion of stage (4), to carry out a maturing of the reaction medium (aqueous suspension) obtained, at the pH obtained on conclusion of this stage (4), generally with stirring, for example for 2 to 45 minutes, in particular for 3 to 30 minutes.

Stages (1) to (4), as in general the whole of the reaction, are generally carried out with stirring.

Likewise, all the stages are usually carried out between 75 and 97° C., preferably between 80 and 96° C.

According to an alternative form of the preferred embodiment of the process of the invention, all the stages are carried out at a constant temperature.

According to another alternative form of the preferred embodiment of the process of the invention, the temperature at the end of the reaction is higher than the temperature at the beginning of the reaction: thus, the temperature at the beginning of the reaction (for example during stages (1) and (2)) is preferably maintained between 75 and 90° C. and then the temperature is increased, preferably up to a value of between 90 and 97° C., at which value it is maintained (for example during stages (3), (4), (i) and (ii)) until the end of the reaction.

In the process, in particular in the preferred embodiment of the process, stage (i) can be carried out in a rapid mixer or in a turbulent flow region, which can make possible better control of the characteristics of the precipitated silicas obtained.

For example, in the case where, in stage (i), first the acidifying agent and then the silicate are added to the aqueous suspension of precipitated silica, the said silicate can then be brought into contact with the medium resulting from the addition of the acidifying agent to the aqueous suspension of precipitated silica in a rapid mixer or in a turbulent flow region.

Likewise, in the case where, in stage (i), the acidifying agent and the silicate are simultaneously added to the aqueous suspension of precipitated silica, the said acidifying agent and the said silicate can then be brought into contact with the aqueous suspension of precipitated silica in a rapid mixer or in a turbulent flow region.

Preferably, the reaction medium obtained in the rapid mixer or in a turbulent flow region feeds a reactor, preferably subjected to stirring, in which reactor stage (ii) is subsequently carried out.

In stage (i), use may be made of a rapid mixer chosen from symmetrical T- or Y-mixers (or tubes), asymmetrical T- or Y-mixers (or tubes), tangential jet mixers, Hartridge-Roughton mixers, vortex mixers or rotor-stator mixers.

Symmetrical T- or Y-mixers (or tubes) are generally composed of two opposing tubes (T-tubes) or two tubes forming an angle of less than 180° (Y-tubes), with the same diameter, discharging into a central tube, the diameter of which is identical to or greater than that of the two preceding tubes. They are said to be "symmetrical" because the two tubes for injecting the reactants exhibit the same diameter and the same angle with respect to the central tube, the device being characterized by an axis of symmetry. Preferably, the central tube exhibits a diameter two times greater approximately than the diameter of the opposing tubes; likewise, the fluid velocity in the central tube is preferably equal to half that in the opposing tubes.

However, it is preferable to employ, in particular when the two fluids to be introduced do not exhibit the same flow rate, an asymmetrical T- or Y-mixer (or tube) rather than a symmetrical T- or Y-mixer (or tube). In the asymmetrical devices, one of the fluids (generally the fluid with the lower flow rate) is injected into the central tube by means of a side tube of smaller diameter. The latter forms an angle generally of 90° with the central tube (T-tube); this angle can be different from 90° (Y-tube), giving cocurrent systems (for example, angle of 45°) or countercurrent systems (for example, angle of 135°), with respect to the other stream.

Use is preferably made, as rapid mixer, of a tangential jet mixer, a Hartridge-Roughton mixer or a vortex mixer (or precipitator), which derive from symmetrical T devices.

More particularly, in stage (i), use may be made of a tangential jet, Hartridge-Roughton or vortex rapid mixer comprising a chamber having (a) at least two tangential admissions via which either, on the one hand, the silicate and, on the other hand, the medium resulting from the addition of acidifying agent to the aqueous suspension of precipitated silica or, on the one hand, the silicate and the acidifying agent and, on the other hand, the aqueous suspension of precipitated silica enter separately (but at the same time) and (b) an axial outlet via which the reaction medium exits, preferably towards a reactor (vessel) positioned in series after the said mixer. The two tangential admissions are preferably situated symmetrically and in opposing fashion with respect to the central axis of the said chamber.

The chamber of the tangential jet, Hartridge-Roughton or vortex mixer optionally used generally exhibits a circular cross section and is preferably cylindrical in shape.

Each tangential admission tube can exhibit an internal diameter d from 0.5 to 80 mm.

This internal diameter d can be between 0.5 and 10 mm, in particular between 1 and 9 mm, for example between 2 and 7 mm. However, in particular on the industrial scale, it is preferably between 10 and 80 mm, in particular between 20 and 60 mm, for example between 30 and 50 mm.

The internal diameter of the chamber of the tangential jet, Hartridge-Roughton or vortex mixer optionally employed can be between 3d and 6d, in particular between 3d and 5d, for example equal to 4d; the internal diameter of the axial outlet tube can be between 1d and 3d, in particular between 1.5d and 2.5d, for example equal to 2d.

The silicate and acidifying agent flow rates are, for example, determined so that, at the point of confluence, the two streams of reactants come into contact with one another in a region of sufficiently turbulent flow.

In the process, in particular in the preferred embodiment of the process, on conclusion of stage (ii), optionally followed by a maturing, a silica slurry is obtained and is subsequently separated (liquid/solid separation).

The separation carried out in the preparation process, in particular in its preferred embodiment, usually comprises a filtration, followed by a washing operation, if necessary. The filtration is carried out according to any suitable method, for example using a filter press, a belt filter or a vacuum filter.

The silica suspension thus recovered (filtration cake) is subsequently dried.

This drying operation can be carried out according to any means known per se.

Preferably, the drying operation is carried out by atomization. To this end, use may be made of any type of suitable atomizer, in particular a rotary, nozzle, liquid pressure or two-fluid atomizer. Generally, when the filtration is carried out using a filter press, a nozzle atomizer is used and, when the filtration is carried out using a vacuum filter, a rotary atomizer is used.

It should be noted that the filtration cake is not always under conditions which make atomization possible, in particular because of its high viscosity. In a way known per se, the cake is then subjected to a disintegration operation. This operation can be carried out mechanically, by passing the cake into a mill of colloid or bead type. Disintegrating is generally carried out in the presence of an aluminium compound, in particular of sodium aluminate, and optionally in the presence of an acidifying agent, such as described above (in the latter case, the aluminium compound and the acidifying agent are generally added simultaneously). The disintegration operation makes it possible in particular to lower the viscosity of the suspension to be subsequently dried.

When the drying operation is carried out using a nozzle atomizer, the silica capable of being then obtained usually exists in the form of substantially spherical beads.

On conclusion of the drying operation, the product recovered can then be subjected to a milling stage. The silica which is then capable of being obtained generally exists in the fowl of a powder.

When the drying is carried out using a rotary atomizer, the silica capable of being then obtained can exist in the form of a powder.

Finally, the product, dried (in particular by a rotary atomizer) or milled as indicated above, can optionally be subjected to an agglomeration stage which comprises, for example, a direct compression, a wet granulation (that is to say, with the use of a binder, such as water, silica suspension, and the like), an extrusion or, preferably, a dry compacting. When the latter technique is employed, it may prove to be advisable, before carrying out the compacting, to deaerate (operation also referred to as predensifying or degassing) the pulverulent products so as to remove the air included in the latter and to provide more uniform compacting.

The silica capable of being then obtained by this agglomeration stage generally exists in the form of granules.

The silica powders, as well as the silica beads, obtained by the abovementioned process thus offer the advantage, inter alia, of providing access, in a simple, effective and economical way, to granules, in particular by conventional shaping operations, such as, for example, a granulation or a compacting, without the latter causing damage capable of obscuring, indeed even destroying, the good properties intrinsically attached to these powders or these beads, as may be the case in the prior art on employing conventional powders.

This preparation process, in particular according to its preferred form, makes it possible in particular to obtain specific precipitated silicas which generally exhibit a good ability to disperse (dispersibility) in polymers and which confer, on the latter, a highly satisfactory compromise in properties. The specific precipitated silicas obtained preferably exhibit a specific morphology, a specific particle size and a specific porosity.

This preparation process makes it possible in particular to obtain specific precipitated silicas which, on the one hand, are nonfriable and generally exhibit a satisfactory ability to disperse (dispersibility) in diene elastomers and, on the other hand, have a good reinforcing effect.

The specific silicas obtained according to this novel process have a specific morphology: this is because it is formed of aggregates of primary silica particles (A), at a surface of which occur (are grafted) primary silica particles (B) with a size smaller than that of the primary particles (A). They can advantageously be employed as reinforcing fillers in diene rubber compositions intended for the manufacture of tires.

These specific silicas are also characterized in that they have:
- a CTAB specific surface ($S_{CTAB}$) of between 60 and 400 m$^2$/g,
- a d50 median size of aggregates (primary particles (A) or large primary particles+primary particles (B) or small primary particles), measured by XDC particle sizing after ultrasonic deagglomeration, such that: d50 (nm)> (6214/$S_{CTAB}$ (m$^2$/g))+23,
- a pore volume distribution such that:

$$V_{(d5-d50)}/V_{(d5-d100)} > 0.906 - (0.0013 \times S_{CTAB} \text{ (m}^2\text{/g)}), \text{ and}$$

- a pore size (diameter) distribution such that:

$$\text{Mode (nm)} > (4166 \times S_{CTAB} \text{ (m}^2\text{/g)}) - 9.2.$$

Preferably, the specific precipitated silica exhibits a parameter C, measured by small angle X-ray scattering (SAXS), such that:

$$C/S_{CTAB} \text{ (m}^2\text{/g)} > 0.001.$$

This illustrates a specific morphology, for example the presence of two populations of primary particles of different sizes.

The specific precipitated silica is advantageously formed of aggregates of large silica primary particles on which occur (are grafted) small silica primary particles (spp), the number median diameter of the large primary particles (lpp) being at least 12 nm, in particular at least 13 nm, for example at least 14 nm, indeed even at least 17 nm, and the number median diameter of the small primary particles (spp) being between 2 and 8 nm, in particular between 3 and 6 nm, for example between 3 and 5 ran (diameters determined by TEM).

In general, the specific precipitated silica comprises (determination by TEM, for example) from 30 to 95%, preferably from 55 to 90%, in particular from 60 to 85%, by number of primary particles (B) (or small primary particles) and from 5 to 70%, preferably from 10 to 45%, in particular from 15 to 40%, by number of primary particles (A) (or large primary particles).

Preferably, in the specific precipitated silica, there are very few, indeed even no, isolated small primary particles ("extragranular"), aggregated or not aggregated together, that is to say not connected to aggregates of large primary particles. The proportion of such isolated small primary particles is generally less than 10% by number, in particular less than 5% by number, for example substantially zero.

Advantageously, in this specific silica, the small primary particles are firmly stuck to the aggregates of large primary particles.

Preferably, the pore volume distribution of the specific precipitated silica is in addition such that $V_{(d5-d50)}/V_{(d5-d100)} > 0.71$, in particular $$V_{(d5-d50)}/V_{(d5-d100)} > 0.72.$$

The specific precipitated silica has a CTAB specific surface ($S_{CTAB}$) of between 60 and 400 m$^2$/g, preferably between 80 and 300 m$^2$/g, in particular between 100 and 250 m$^2$/g. It can be between 120 and 230 m$^2$/g, in particular between 130 and 210 m$^2$/g, for example between 140 and 200 m$^2$/g.

It generally exhibits a BET specific surface ($S_{BET}$) of between 60 and 500 m$^2$/g, preferably between 90 and 380 m$^2$/g, in particular between 120 and 300 m$^2$/g. It can be between 140 and 270 m$^2$/g, in particular between 160 and 260 m$^2$/g, for example between 175 and 250 m$^2$/g.

Preferably, the specific precipitated silica has a degree of microporosity but not an excessively high degree; thus, in general, its CTAB specific surface ($S_{CTAB}$) and its BET specific surface ($S_{BET}$) are such that the $S_{BET}/S_{CTAB}$ ratio is between 1.0 and 1.5, preferably between 1.1 and 1.4, in particular between 1.15 and 1.35.

The specific precipitated silicas preferably exhibit a satisfactory ability to disperse (dispersibility) in polymers.

Their median diameter ($D_{50m}$), after ultrasonic deagglomeration, is generally less than 6.0 µm, preferably less than 5.0 µm; it can in particular be less than 4.0 µm, for example less than 3.0 µm.

They can also have a rate of deagglomeration α, measured in the continuous mode ultrasonic deagglomeration test described above, at 100% power of a 600 watt ultrasonic probe, of at least 0.020 µm$^{-1}$·min$^{-1}$.

The number of silanols per nm$^2$, $N_{SiOH/nm^2}$, of the silicas produced according to the abovementioned process is usually between 3.5 and 6, in particular between 3.9 and 5.5.

The pH of the precipitated silicas obtained is usually between 6.2 and 7.6, in particular between 6.4 and 7.4.

They can be provided in the form of substantially spherical beads with a mean size of at least 80 µm.

This mean size of the beads can be at least 100 µm, for example at least 150 µm; it is generally at most 300 µm and preferably lies between 100 and 270 µm, in particular between 200 and 260 µm. This mean size is determined according to Standard NF X 11507 (December 1970) by dry sieving and determination of the corresponding diameter at a cumulative oversize of 50%.

The specific silicas can also be provided in the form of a powder, generally with a mean size of at least 3 µm, in particular of at least 10 µm, for example of at least 15 µm; the latter can be between 15 and 60 µm (in particular between 20 and 45 µm) or between 30 and 150 µm (in particular between 45 and 120 µm).

They can also be provided in the form of granules (generally of substantially parallelepipedal shape), in particular with a size of at least 1 mm, for example of between 1 and 10 mm, in particular along the axis of their greatest dimension (length).

The specific silicas are preferably prepared according to the preparation process in accordance with the invention which is described above, in particular according to the preferred embodiment of the said process.

The above specific silica can advantageously constitute all of the reinforcing inorganic filler. However, this specific silica can optionally be combined with at least one other conventional reinforcing inorganic filler. In such a case, the level of each of its inorganic fillers can vary from 1 to 99% by weight of the total reinforcing inorganic filler. In particular, it is advantageous for the specific silica used to constitute at least 50% by weight of the total reinforcing inorganic filler, more preferably still more than 80% by weight of this total reinforcing inorganic filler.

Mention will in particular be made, as example of conventional reinforcing inorganic filler which can be used, if appropriate, in addition, of highly dispersible silicas, such as the BV3380 and Ultrasil 7000 silicas from Degussa, the Zeosil 1165 MP and 1115 MP silicas from Rhodia, the Hi-Sil 2000 silica from PPG, the Zeopol 8715 and 8745 silicas from Huber, treated precipitated silicas, such as, for example, the silicas "doped" with aluminium described in the abovementioned Application EP-A-0735088, or also highly to dispersible reinforcing aluminas, such as described in Application EP-A-0810258, for example A125 or CR125 aluminas from Baïkowski.

Mention may also be made, as other examples of inorganic filler capable of being used in the rubber compositions of the invention, of aluminium (oxide) hydroxides, aluminosilicates, titanium oxides, silicon carbides or silicon nitrides, all of the reinforcing type, such as described, for example, in Applications WO 99/28376, WO 00/73372, WO 02/053634, WO 2004/003067 and WO 2004/056915.

A person skilled in the art will understand that a reinforcing filler of the organic type, in particular a tire carbon black, covered at least in part with an inorganic layer, in particular with silica, for its part requiring the use of a coupling agent in order to provide the bonding with the elastomer, might be used as filler equivalent to such an additional reinforcing inorganic filler.

The specific silica, used alone or as a blend with other reinforcing inorganic fillers, can also be used as a blend with reinforcing organic fillers in such a way that this specific silica represents from 1 to 99% by weight of the total reinforcing filler, the reinforcing organic filler then representing from 99% to 1% by weight of the total reinforcing filler.

Preferably, the specific silica represents more than 10% of the total reinforcing filler, or preferably more than 20% of this total reinforcing filler and more preferably still more than 50%.

All carbon blacks, in particular blacks of the HAF, ISAF or SAF type, conventionally used in tires ("tire-grade" blacks) are suitable as reinforcing organic filler. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example N660, N683 or N772), indeed even N990.

In the case of the use of carbon blacks with an isoprene elastomer, the carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO-A-2006/069792 and WO-A-2006/069793.

It should be noted that, even when the inorganic filler is predominant, it is possible to combine it with a carbon black, then preferably used in a small proportion, at a level preferably of between 2 and 20 phr, more preferably in a range from 5 to 15 phr. Within the intervals indicated, benefit is derived from the colouring (black pigmenting agent) and UV-stabilizing properties of the carbon blacks without, moreover, penalizing the typical performances introduced by the silica.

Preferably, the level of total reinforcing filler (reinforcing inorganic filler and reinforcing organic filler, if appropriate) is within a range extending from 20 to 300 phr, more preferably from 30 to 150 phr, more preferably still from 50 to 130 phr (parts by weight per one hundred of elastomer), the optimum being different depending on the nature of the reinforcing inorganic filler used and depending on the applications targeted: the level of reinforcement expected with regard to a bicycle tire, for example, is in a known way markedly less than that required with regard to a tire capable of running at high speed in a sustained manner, for example a motorcycle tire, a tire for a passenger vehicle or a tire for a utility vehicle, such as a heavy duty vehicle.

For the treads of tires capable of running at high speed, the amount of specific silica prepared according to the preparation process described above and/or exhibiting the characteristics described above is preferably between 30 and 120 phr, more preferably between 40 and 100 phr.

II.3 Coupling Agent

It is well known to a person skilled in the art that it is necessary to use, in the case of a reinforcing inorganic filler, a coupling agent, also known as bonding agent, the role of which is to provide the bonding or "coupling" between the inorganic filler and the elastomer while facilitating the dispersion of this inorganic filler in the elastomeric matrix.

The reinforcing magnesium hydroxide requires for its part also the use of such a coupling agent in order to ensure its function of reinforcing filler in the rubber compositions in accordance with the invention.

The term "coupling agent" is understood to mean more specifically an agent capable of establishing a satisfactory connection of chemical and/or physical nature between the filler under consideration and the elastomer; such an at least bifunctional coupling agent has, for example, as simplified general formula, "Y-T-X", in which:

Y represents a functional group ("Y" functional group) which is capable of being bonded physically and/or chemically to the inorganic filler, it being possible for such a bond to be established, for example, between a silicon atom of the coupling agent and the surface hydroxyl (OH) groups of the inorganic filler;

X represents a functional group ("X" functional group) capable of being bonded physically and/or chemically to the elastomer, for example via a sulphur atom;

T represents a group which makes it possible to connect Y and X.

The coupling agents in particular must not be confused with simple agents for covering the filler under consideration which, in a known way, can comprise the Y functional group active with regard to the filler but are devoid of the X functional group active with regard to the elastomer.

Such coupling agents, of variable effectiveness, have been described in a very large number of documents and are well known to a person skilled in the art. Use may in fact be made of any coupling agent capable of efficiently providing the bonding or coupling between a reinforcing inorganic filler, such as silica, and a diene elastomer, such as, for example, an organosilane, in particular an alkoxysilane sulphide, or a polyorganosiloxane which is at least bifunctional (carrying the abovementioned X and Y functional groups).

Silica/elastomer coupling agents, in particular, have been described in a large number of documents, the most well known being bifunctional alkoxysilanes, such as alkoxysilane sulphides. Use is made in particular of alkoxysilane sulphides, known as "symmetrical" or "unsymmetrical"

according to their specific structure, such as described, for example, in Patent Applications or U.S. Pat. Nos. 3,842,111, 3,873,489, 3,978,103, 3,997,581, 4,002,594, 4,072,701 and 4,129,585, or in the more recent documents U.S. Pat. Nos. 5,580,919, 5,583,245, 5,650,457, 5,663,358, 5,663,395, 5,663,396, 5,674,932, 5,675,014, 5,684,171, 5,684,172, 5,696,197, 5,708,053, 5,892,085 and WO 02/083782, or which set out in detail such known compounds.

Symmetrical alkoxysilane polysulphides corresponding to the following general formula (I):

Z-A-S$_n$-A-Z, in which:     (I)

n is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

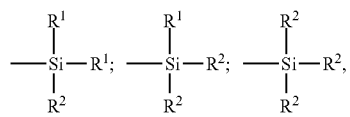

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a hydroxyl or $C_1$-$C_{18}$ alkoxyl or $C_5$-$C_{18}$ cycloalkoxyl group (preferably hydroxyl, $C_1$-$C_8$ alkoxyl or $C_5$-$C_8$ cycloalkoxyl groups, more preferably hydroxyl or $C_1$-$C_4$ alkoxyl groups, in particular hydroxyl, methoxyl and/or ethoxyl),
are suitable in particular for the implementation of the invention, without the above definition being limiting.

In the case of a mixture of alkoxysilane polysulphides corresponding to the above formula (I), in particular the usual mixtures available commercially, the mean value of the "n" index is a fractional number preferably of between 2 and 5, more preferably in the vicinity of 4. However, the invention can also advantageously be carried out, for example, with alkoxysilane disulphides (n=2).

Mention will more particularly be made, as examples of silane polysulphides, of bis(($C_1$-$C_4$)alkoxyl($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides, for example bis(3-triethoxysilylpropyl) tetrasulphide, abbreviated to TESPT, of formula [($C_2H_5O$)$_3$Si($CH_2$)$_3S_2$]$_2$, or bis(triethoxysilylpropyl) disulphide, abbreviated to TESPD, of formula [($C_2H_5O$)$_3$Si($CH_2$)$_3$S]$_2$.

TESPD is sold, for example, by Degussa under the name Si75 (in the form of a mixture of disulphide, at 75% by weight, and of polysulphides) or by Witco under the name Silquest A1589. TESPT is sold, for example, by Degussa under the name Si69 (or X50S, when it is supported at 50% by weight on carbon black) or by Osi Specialties under the name Silquest A1289 (in both cases, commercial mixture of polysulphides with a mean value for n which is approximately 4).

Mention will also be made, as preferred coupling agents, of bis(mono($C_1$-$C_4$)alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, as described in Application WO 02/083782.

Mention will in particular be made, as examples of coupling agents other than the abovementioned alkoxysilanes polysulphides, of bifunctional polyorganosiloxanes, such as described, for example, in Patent Applications WO 99/02602 or WO 01/96442, or of hydroxysilane polysulphides ($R^2$ then represents OH in the above formula I), such as described in Applications WO 02/30939 and WO 02/31041, or of silanes or POS carrying azodicarbonyl functional groups, such as described, for example, in Patent Applications WO 2006/125532, WO 2006/125533 and WO 2006/125534.

A person skilled in the art will know how to adjust the content of coupling agent in the compositions of the invention as a function of the application targeted, the nature of the elastomer used and the amount of reinforcing magnesium hydroxide, supplemented, if appropriate, with any other inorganic filler employed as additional reinforcing filler.

The level of coupling agent, corrected for the weight of diene elastomer, is preferably between 0.1 and 15 phr, more preferentially between 0.5 and 10 phr.

The coupling agent used might be grafted beforehand (via the "X" functional group) to a diene elastomer of the composition of the invention, the elastomer, thus functionalized or precoupled, then comprising the free "Y" functional group for the reinforcing magnesium hydroxide. The coupling agent might also be grafted beforehand (via the "Y" functional group) to the reinforcing magnesium hydroxide, it being possible for the filler, thus "precoupled", to subsequently be bonded to the diene elastomer via the free "X" functional groups. However, it is preferable to use the coupling agent in the free state (i.e., ungrafted) or grafted to the reinforcing magnesium hydroxide, in particular for reasons of better processability of the compositions in the raw state.

II.4 Various Additives

Of course, the tire elastomeric compositions in accordance with the invention also comprise all or a portion of the usual additives used in diene rubber compositions intended in particular for the manufacture of tire treads, such as, for example, extending oils, plasticizing agents, protection agents, such as antiozone waxes, chemical antiozonants, antioxidants, antifatigue agents, adhesion promoters, coupling activators, reinforcing resins, methylene acceptors and/or donors, a crosslinking system based either on sulphur or on sulphur donors and/or on peroxide and/or on bismaleimides, vulcanization accelerators or vulcanization activators.

As preferred nonaromatic or very slightly aromatic plasticizing agent, at least one compound chosen from the group consisting of naphthenic oils, paraffinic oils, MES oils, TDAE oils, ester plasticizers (for example glycerol trioleates), hydrocarbon resins exhibiting a high Tg, preferably greater than 30° C., such as described, for example, in Applications WO 2005/087859, WO 2006/061064 and WO 2007/017060, and the mixtures of such compounds. The overall level of such a preferred plasticizing agent is preferably between 10 and 100 phr, more preferably between 20 and 80 phr, in particular in a range from 10 to 50 phr.

Mention will in particular be made, among the above plasticizing hydrocarbon resins (it should be remembered that the name "resin" is reserved by definition for a solid compound), of resins formed of homo- or copolymers of α-pinene, β-pinene, dipentene or polylimonene, $C_5$ fraction, for example formed of $C_5$ fraction/stirene copolymer or formed of C$_5$ fraction/C$_9$ fraction copolymer, which can be used alone or in combination with plasticizing oils, such as, for example, MES oils or TDAE oils.

The silica used in the invention can also be combined, if need be, with a conventional white filler which is only slightly or not reinforcing, for example particles of clay, bentonite, talc, chalk or kaolin, which can be used, for example, in coloured tire treads.

The elastomeric compositions can also comprise, in addition to the coupling agents described above, covering agents for inorganic fillers, for example comprising just a Y functional group, or more generally processing aids capable, in a known way, by virtue of improvement in the dispersion of a reinforcing inorganic filler in the rubber matrix and of a lowering in the viscosity of the compositions, of improving their processability in the crude state; these agents, used at a preferred level of between 0.5 and 3 phr, are, for example, alkylalkoxysilanes, in particular alkyltriethoxysilanes, such as 1-octyltriethoxysilane, sold by Degussa-Hüls under the name Dynasylan Octeo, or 1-hexadecyltriethoxysilane, sold by Degussa-Hüls under the name Si216, polyols, polyethers (for example, polyethylene glycols), primary, secondary or tertiary amines (for example, trialkanolamines), or hydroxylated or hydrolysable polyorganosiloxanes, for example α,ω-dihydroxypolyorganosiloxanes (in particular α,ω-dihydroxypolydimethylsiloxanes).

II.5 Preparation of the Rubber Compositions and the Treads

The tire elastomeric compositions are manufactured in appropriate mixers using two successive preparation phases well known to a person skilled in the art: a first phase of thermomechanical working or kneading (sometimes described as "non-productive" phase) at high temperature, up to a maximum temperature (recorded as Tmax) of between 110° C. and 190° C., preferably between 130° C. and 180° C., followed by a second phase of mechanical working (sometimes described as "productive" phase) at a lower temperature, typically of less than 110° C., for example between 40° C. and 100° C., finishing phase during which the base crosslinking or vulcanization system is incorporated: such phases have been described, for example, in the above-mentioned Applications EP 501 227, EP 735 088, WO00/05300 or WO00/05301.

The process for the manufacture of the compositions according to the invention is characterized in that at least the silica used in the invention (in combination or not with another reinforcing inorganic filler or with a reinforcing organic filler, such as a carbon black) and the coupling agent are incorporated by kneading in the diene elastomer during the first "non-productive" phase, that is to say that at least these various base constituents are introduced into the mixer and are thermomechanically kneaded, in a single stage or several stages, until a maximum temperature of between 110° C. and 190° C., preferably between 130° C. and 180° C., is reached.

By way of example, the first (non-productive) phase is carried out in a single thermomechanical stage during which, in a first step, all the base constituents necessary (diene elastomer, reinforcing inorganic filler and coupling agent) are introduced into an appropriate mixer, such as a normal internal mixer, followed, in a second step, for example after kneading for one to two minutes, by the introduction of the optional additional covering agents or processing aids and other various additives, with the exception of the crosslinking or vulcanization system: as the bulk density of the silica according to the invention is generally low, it can be advantageous to divide up its introduction into two or more parts.

A second stage (indeed even several) of thermomechanical working can be added in this internal mixer, after dropping the mixture and intermediate cooling (cooling temperature preferably less than 100° C.), with the aim of subjecting the compositions to an additional thermomechanical treatment, in particular for further improving the dispersion, in the elastomeric matrix, of the reinforcing inorganic filler and of its coupling agent. The total duration of the kneading, in this non-productive phase, is preferably between 2 and 10 minutes.

After cooling the mixture thus obtained, the crosslinking or vulcanization system is then incorporated at low temperature, generally in an external mixer, such as an open mill; the combined mixture is then mixed (productive phase) for a few minutes, for example between 5 and 15 minutes.

The crosslinking or vulcanization system proper is preferably based on sulphur and on a primary vulcanization accelerator, in particular on an accelerator of the sulphenamide type. Various known vulcanization activators or secondary accelerators, such as zinc oxide, stearic acid, guanidine derivatives (in particular diphenylguanidine), and the like, incorporated during the first non-productive phase and/or during the productive phase, are additional to this base vulcanization system. Sulphur is used at a preferred level of between 0.5 and 10 phr, or preferably of between 0.5 and 5.0 phr, for example between 0.5 and 3.0 phr, when the invention is applied to a tire tread. The primary vulcanization accelerator is used at a preferred level of between 0.5 and 10 phr, more preferably of between 0.5 and 5.0 phr, in particular when the invention applies to a tire tread.

To summarize, the process for preparing a tire diene rubber composition in accordance with the invention comprises the following stages:
the following are incorporated in a diene elastomer during a first "non-productive" stage:
as reinforcing filler, at least one inorganic filler, in all or part composed of a silica obtained according to the process described above and/or for exhibiting the characteristics as defined above,
and a coupling agent which provides the bonding between the inorganic filler and the diene elastomer;
the combined mixture is kneaded thermomechanically, in a single stage or several stages, until a maximum temperature of between 110° C. and 190° C. is reached;
the combination is cooled to a temperature of less than 100° C.;
subsequently, during a second "productive" stage, a crosslinking or vulcanization system is incorporated;
the combined mixture is kneaded up to a maximum temperature of less than 110° C.

The final composition thus obtained is subsequently calendered, for example in the form of plaques (thickness of 2 to 3 mm) or of fine sheets of rubber for the measurement of its physical or mechanical properties, in particular for a laboratory characterization, or also extruded to form rubber profiled elements used directly in the manufacture of semi-finished products, such as treads, crown plies, sidewalls, carcass plies, beads, protectors, air chambers or airtight internal rubbers for a tubeless tire.

The vulcanization or curing of the rubber composition, in particular of the tread produced with the latter or of the tire, is carried out in a known way at a temperature preferably of between 130° C. and 200° C., preferably under pressure, for a sufficient time which can be varied, for example, between 5 and 90 min according in particular to the curing temperature, the vulcanization system adopted, the kinetics of vulcanization of the composition under consideration and the size of the tire.

The silica-based tire diene rubber compositions described above are advantageously used in the manufacture of tire treads. In this case, they generally constitute the whole of the tread in accordance with the invention. However, the invention also applies to the cases where these rubber compositions form only a portion of a tread of the composite type, for example composed of transversely different adjacent bands or also of two radially superimposed layers with different constitutions, it being possible for the part comprising silica filler to constitute, for example, the radially external layer of a tread intended to come into contact with the ground from the beginning of the rolling of the new tire or, on the contrary, its radially internal layer intended to come into contact with the ground subsequently.

It is obvious that the present invention relates to the rubber compositions, the treads and the tires described above both in the "raw" state (i.e., before curing) and in the "cured" or vulcanized state (i.e., after vulcanization).

III Examples of the Implementation of the Invention

III.1 Preparation of the Fillers
III.1.1 Control Silica B

The silica B corresponds to the prior art of Patent Application WO 03/016387, prepared according to the process described in detail in Example 2 (filler C) of the said application, the text of which is repeated here by way of reference. The detailed description of the process for preparing this silica B is taken up again here:

700 liters of industrial water are introduced into a 2000 liter reactor. This solution is brought to 80° C. by heating by direct injection of steam. Sulphuric acid, with a concentration equal to 80 g/l, is introduced with stirring (95 rev/min) until the pH reaches a value of 4.

The following are introduced simultaneously into the reactor over 35 minutes: a sodium silicate solution (with an $SiO_2/Na_2O$ ratio by weight equal to 152) having a concentration of 230 g/l at a flow rate of 190 l/hour and sulphuric acid having a concentration of 80 g/l at a flow rate adjusted so as to maintain the pH of the reaction medium at a value of 4.

On completion of the 35 minutes of simultaneous addition, the introduction of acid is halted as long as the pH has not reached a value equal to 8. A further simultaneous addition is subsequently carried out over 40 minutes with a sodium silicate flow rate of 190 l/hour (same sodium silicate as for the first simultaneous addition) and a sulphuric acid flow rate, the sulphuric acid having a concentration of 80 g/l, adjusted so as to maintain the pH of the reaction medium at a value of 8.

On completion of this simultaneous addition, the reaction medium is brought to a pH of 5.2 with sulphuric acid having a concentration of 80 g/l. The medium is matured for 5 minutes at pH 5.2.

The slurry is filtered on a filter press and the cake is washed (solids content of the cake 22%). The cake obtained is disintegrated with addition of an amount of sodium aluminate corresponding to an $Al/SiO_2$ ratio by weight of 0.3%. The resulting slurry is atomized using a nozzle atomizer.

III.1.2 Silica C in Accordance with the Invention

The following are introduced in a 25 liter stainless steel reactor equipped with a propeller stirring system and jacket heating:

7.2 liters of water
4050 grams of aqueous sodium silicate exhibiting an $SiO_2/Na_2O$ ratio by weight equal to 3.45 and having a concentration of 235 g/l
125 grams of sodium sulphate $Na_2SO_4$ (electrolyte).

The silicate concentration (expressed as $SiO_2$) in the vessel heel is then 74 g/l.

The mixture is homogenized by stirring and brought to 82° C. The entire reaction is carried out with stirring (300 rev/min, propeller stirring).

Sulphuric acid with a concentration equal to 80 g/l is introduced into the mixture at a flow rate of 80 g/min until the pH of the reaction medium reaches a value of 8 (i.e., 4380 grams of sulphuric acid in 55 minutes approximately). After adding sulphuric acid for 30 minutes, the temperature of the reaction medium is brought to 94° C.

Once acidification has been completed, the following are introduced simultaneously into the reaction medium over 30 minutes: a sodium silicate solution (with an $SiO_2/Na_2O$ ratio by weight equal to 3.45) having a concentration of 235 g/l at a flow rate of 34 g/min and sulphuric acid having a concentration of 80 g/l at a flow rate adjusted so as to maintain the pH of the reaction medium at a value of 8.

On completion of the 30 minutes of simultaneous addition, sulphuric acid having a concentration of 80 g/l is introduced at a flow rate of 80 g/min until the pH of the reaction medium reaches a value of 3 (i.e., 1288 grams of sulphuric acid in 16 minutes approximately).

The following are subsequently introduced simultaneously into the reaction medium over 15 minutes: a sodium silicate solution (with an $SiO_2/Na_2O$ ratio by weight equal to 3.45) having a concentration of 235 g/l at a flow rate of 34 g/min and sulphuric acid having a concentration of 80 g/l at a flow rate adjusted so as to maintain the pH of the reaction medium at a value of 3.

On completion of the 15 minutes of this second simultaneous addition, a sodium silicate solution of the type described above is introduced at a flow rate of 34 g/min so as to bring the pH of the reaction medium back to 5.2 (i.e., 783 grams of silicate solution in 23 minutes).

On conclusion of the reaction, a precipitated silica reaction slurry is obtained and is kept stirred at a temperature of 94° C. for 5 minutes. After this maturing, the precipitated silica slurry is recovered by emptying the reactor.

The slurry is filtered and washed under vacuum (solids content of 14% by weight). The filtration cake obtained is washed 4 times with 5 liters of water. It is subsequently resuspended by mechanical disintegration in the presence of water and sodium aluminate ($Al/SiO_2$ ratio by weight of 0.3%). The resulting slurry (solids content of 10% by weight) is dried using a rotary atomizer.

The characteristics of the precipitated silica C obtained (in the powder form) are then as follows:
CTAB specific surface: 192 $m^2/g$
BET specific surface: 220 $m^2/g$
d50 median size of aggregates: 61 nm
$V_{(d5-d50)}/V_{(d5-d100)}$: 0.73
Mode (Hg porosimetry): 14.7 nm
C(SAXS): 0.350
$D_{50M}$ (after ultrasonic deagglomeration): 2.4 µm
α: 0.045 $\mu m^{-1} \cdot min^{-1}$
$N_{SiOH/nm2}$: 5.0
pH: 7.3

It is found, in particular by TEM, that the precipitated silica C is formed of aggregates of large silica primary particles (lpp) with a number median diameter of 13.5 nm, at the surface of which small silica primary particles (spp), with a number median diameter of 3.9 nm, occur.

III.1.3 Silica D in Accordance with the Invention

The following are introduced into a 2000 liter stainless steel reactor equipped with a propeller stirring system and jacket heating:
- 593 liters of water
- 329 liters of aqueous sodium silicate exhibiting an $SiO_2/Na_2O$ ratio by weight equal to 3.45 and having a concentration of 235 g/l
- 13.4 kg of sodium sulphate $Na_2SO_4$ (electrolyte).

The silicate concentration (expressed as $SiO_2$) in the vessel heel is then 75 g/l. The mixture is homogenized by stirring and brought to 95° C. The entire reaction is carried out with stirring (80 rev/min).

Sulphuric acid with a concentration equal to 80 g/l is introduced into the mixture at a flow rate of 490 l/h for 15 minutes and then at a flow rate of 1480 l/h until the pH of the reaction medium reaches a value of 8.

Once acidification has been completed, the following are introduced simultaneously in the reaction medium over 20 minutes: a sodium silicate solution (with an $SiO_2/Na_2O$ ratio by weight equal to 3.45) having a concentration of 235 g/l at a flow rate of 198 l/h and sulphuric acid having a concentration of 80 g/l at a flow rate adjusted so as to maintain the pH of the reaction medium at a value of 8.

At the end of the 20 minutes of simultaneous addition, sulphuric acid having a concentration of 80 g/l is introduced at a flow rate of 400 l/h until the pH of the reaction medium reaches a value of 4.

The following are subsequently introduced simultaneously into the reaction medium over 85 minutes: a sodium silicate solution (with an $SiO_2/Na_2O$ ratio by weight equal to 3.45) having a concentration of 235 g/l at a flow rate of 85 l/h and sulphuric acid having a concentration of 80 g/l at a flow rate adjusted so as to maintain the pH of the reaction medium at a value of 4.

At the end of the 85 minutes of this second simultaneous addition, a sodium silicate solution of the type described above is introduced at a flow rate of 97 l/h so as to bring the pH of the reaction medium back to 5.2.

On conclusion of the reaction, a precipitated silica reaction slurry is obtained and is kept stirred at a temperature of 95° C. for 5 minutes. After this maturing, the precipitated silica slurry is recovered by emptying the reactor.

The slurry is filtered through a filter press (solids content of 25% by weight). The filtration cake obtained is resuspended by mechanical disintegration in the presence of water and sodium aluminate ($Al/SiO_2$ ratio by weight of 0.3%). The resulting slurry is subsequently dried using a nozzle atomizer.

The characteristics of the precipitated silica D obtained (in the form of substantially spherical beads) are then as follows:
- CTAB specific surface: 151 m²/g
- BET specific surface: 189 m²/g
- d50 median size of aggregates: 78 nm
- $V_{(d5-d50)}/V_{(d5-d100)}$: 0.75
- Mode (Hg porosimetry): 23.0 nm
- C(SAXS): 0.640
- $D_{50M}$ (after ultrasonic deagglomeration): 2.2 μm
- α: 0.031 μm$^{-1}$·min$^{-1}$
- $N_{SiOH/nm2}$: 4.8
- pH: 6.6

It is found, in particular by TEM, that the precipitated silica D is formed of aggregates of large silica primary particles (lpp) with a number median diameter of 18.3 nm, at the surface of which small silica primary particles (spp), with a number median diameter of 4.3 nm, occur.

III.1.4 Silica E in Accordance with the Invention

The following are introduced into a 25 liter stainless steel reactor equipped with a propeller stirring system and jacket heating:
- 7.91 liters of water
- 4286 grams of aqueous sodium silicate exhibiting an $SiO_2/Na_2O$ ratio by weight equal to 3.45 and having a concentration of 235 g/l
- 134 grams of sodium sulphate $Na_2SO_4$ (electrolyte).

The silicate concentration (expressed as $SiO_2$) in the vessel heel is then 72 g/l.

The mixture is homogenized by stirring and brought to 92° C. The entire reaction is carried out with stirring (300 rev/min, propeller stirring).

Sulphuric acid with a concentration equal to 80 g/l is introduced into the mixture at a flow rate of 146 g/min until the pH of the reaction medium reaches a value of 8 (i.e., 4380 grams of sulphuric acid in 30 minutes approximately).

Once acidification has been completed, the following are simultaneously introduced into the reaction medium over 25 minutes: a sodium silicate solution (with an $SiO_2/Na_2O$ ratio by weight equal to 3.45) having a concentration of 235 g/l at a flow rate of 32 g/min and sulphuric acid having a concentration of 80 g/l at a flow rate adjusted so as to maintain the pH of the reaction medium at a value of 8.

At the end of the 30 minutes of simultaneous addition, sulphuric acid having a concentration of 80 g/l is introduced at a flow rate of 80 g/min until the pH of the reaction medium reaches a value of 4 (i.e., 418 grams of sulphuric acid in 5 minutes approximately).

The following are subsequently introduced simultaneously into the reaction medium over 140 minutes: a sodium silicate solution (with an $SiO_2/Na_2O$ ratio by weight equal to 3.45) having a concentration of 235 g/l at a flow rate of 19 g/min and sulphuric acid having a concentration of 80 g/l at a flow rate adjusted so as to maintain the pH of the reaction medium at a value of 4.

At the end of the 140 minutes of this second simultaneous addition, a sodium silicate solution of the type described above is introduced at a flow rate of 19 g/min so as to bring the pH of the reaction medium back to 5.2 (i.e., 98 grams of silicate solution in 5 minutes).

On conclusion of the reaction, a precipitated silica reaction slurry is obtained and is kept stirred at a temperature of 94° C. for 5 minutes. After this maturing, the precipitated silica slurry is recovered by emptying the reactor.

The slurry is filtered and washed under vacuum (solids content of 18% by weight). The filtration cake obtained is washed 4 times with 5 liters of water. It is subsequently resuspended by mechanical disintegration in the presence of water and sodium aluminate ($Al/SiO_2$ ratio by weight of 0.3%). The resulting slurry (solids content of 10% by weight) is dried using a rotary atomizer.

The characteristics of the precipitated silica E obtained (in the powder form) are then as follows:
- CTAS specific surface: 183 m²/g
- BET specific surface: 240 m²/g
- d50 median size of aggregates: 83 nm
- $V_{(d5-d50)}/V_{(d5-d100)}$: 0.81
- Mode (Hg porosimetry): 20.5 nm
- C(SAXS): 0.466
- $D_{50M}$ (after ultrasonic deagglomeration): 3.5 μm
- α: 0.032 μm$^{-1}$·min$^{-1}$
- $N_{SiOH/nm2}$: 3.9
- pH: 6.5

It is found, in particular by TEM, that the precipitated silica E is formed of aggregates of large silica primary particles (lpp) with a number median diameter of 22.0 nm, at the surface of which small silica primary particles (spp), with a number median diameter of 3.9 nm, occur.

III.2 Fillers Used

The filler denoted A is a conventional highly dispersible HD silica having a high specific surface (BET of approximately 160 m²/g), which is a reference inorganic filler for the reinforcing of the treads of "Green Tires" ("Zeosil 1165 MP" silica from Rhodia).

The filler B is a highly dispersible silica obtained according to the process described in Patent Application WO 03/016387 according to the process described above.

The fillers C, D and E are highly dispersible silicas obtained according to the novel process described above and advantageously conform to all of the following characteristics:

They are formed of aggregates of primary silica particles, at the surface of which occur primary silica particles with a smaller size than that of the primary particles, and they have:
- a CTAB specific surface ($S_{CTAB}$) of between 100 and 250 m²/g,
- a d50 median size of aggregates, measured by XDC particle sizing after ultrasonic deagglomeration, such that:

$$d50\ (nm) > (6214/S_{CTAB}\ (m^2/g)) + 23,$$

a pore volume distribution such that:

$$V_{(d5-d50)}/V_{(d5-d100)} > 0.906 - (0.0013 \times S_{CTAB}\ (m^2/g)), \text{ and}$$

a pore size distribution such that:

$$\text{Mode (nm)} > (4166/S_{CTAB}\ (m^2/g)) - 9.2.$$

III.3 Preparation of the Compositions

The tests which follow are carried out in the following way: the diene elastomer (or the mixtures of diene elastomers, if appropriate), the reinforcing filler and the coupling agent are introduced into an internal mixer, 70% filled and having an initial vessel temperature of approximately 60° C., followed, after kneading for one to two minutes, by the various other ingredients, with the exception of the sulphur and sulphenamide primary accelerator. Thermomechanical working (non-productive phase) is then carried out in one or two stages (total duration of the kneading equal to approximately 7 min), until a maximum "dropping" temperature of approximately 160-165° C. is reached.

The mixture thus obtained is recovered and cooled and then sulphur and sulphenamide accelerator are added on an external mixer (homofinisher) at 30° C., the combined mixture being mixed (productive phase) for 3 to 4 minutes.

The compositions are subsequently either calendered in the form of plaques (thickness of 2 to 3 mm), for the measurement of their physical or mechanical properties, or are extruded directly in the form of tire treads.

III.4 Tests

In the tests which follow, the highly dispersible silica used (A, B, C, D or E) advantageously constitutes the whole of the reinforcing inorganic filler, in combination with a low level of carbon black (less than 10 phr).

III.4.1 Test 1

The aim of this test is to demonstrate the improved rubber properties of several compositions based on different HD silicas in accordance with the invention, in comparison with a control elastomeric composition using a conventional HD silica and with a composition in accordance with the prior art using a specific HD silica.

For this, five diene rubber (SBR/BR blend) compositions intended for the manufacture of treads for passenger vehicle tires are compared:

the control composition C-1 comprises the silica A,
the control composition C-2 comprises the silica B,
the composition in accordance with the invention I-1 comprises the silica C,
the composition in accordance with the invention I-2 comprises the silica D,
the composition in accordance with the invention I-3 comprises the silica E.

The formulation of the various compositions is given in Table 1, the levels being expressed in phr, parts per hundred parts by weight of elastomers.

TABLE 1

| | Composition No. | | | | |
|---|---|---|---|---|---|
| | C-1 | C-2 | I-1 | I-2 | I-3 |
| SBR (1) | 70 | 70 | 70 | 70 | 70 |
| BR (2) | 30 | 30 | 30 | 30 | 30 |
| Silica A | 80 | — | — | — | — |
| Silica B | — | 80 | — | — | — |
| Silica C | — | — | 80 | — | — |
| Silica D | — | — | — | 80 | — |
| Silica E | — | — | — | — | 80 |
| Carbon black (3) | 6 | 6 | 6 | 6 | 6 |
| TESPT (4) | 6.40 | 7.20 | 7.02 | 5.52 | 6.77 |
| DPG (5) | 1.50 | 1.91 | 1.95 | 1.59 | 2.11 |
| Antioxidant (6) | 1.9 | 1.9 | 1.9 | 1.9 | 1.9 |
| Resin (8) | 15 | 15 | 15 | 15 | 15 |
| Oil (9) | 8 | 8 | 8 | 8 | 8 |
| Sulphur | 1.1 | 1.1 | 1.1 | 1.1 | 1.1 |
| Accelerator (10) | 2 | 2 | 2 | 2 | 2 |
| ZnO | 2.5 | 2.5 | 2.5 | 2.5 | 2.5 |
| Stearic acid | 2 | 2 | 2 | 2 | 2 |

(1) SSBR with 58% of 1,2-polybutadiene units and 25% of stirene; Tg = −30° C.
(2) BR (with 4.3% of 1,2-; 2.7% of trans-1,4-; 93% of cis-1,4-) (Tg = −103° C.);
(3) Carbon black N234;
(4) TESPT ("Si69" from Degussa);
(5) Diphenylguanidine ("Vulcacit D" from Bayer);
(6) N-(1,3-Dimethylbutyl)-N-phenyl-para-phenylenediamine ("Santoflex 6-PPD" from Flexsys);
(8) THER 9872 resin, sold by DRT;
(9) MES/HPD, sold by Total;
(10) N-Cyclohexyl-2-benzothiazolesulphenamide (Flexsys: "Santocure" CBS).

The properties measured before and after curing at 150° C. for 40 minutes are given in the Table 2.

TABLE 2

| | Composition No. | | | | |
|---|---|---|---|---|---|
| | C-1 | C-2 | I-1 | I-2 | I-3 |
| Properties before curing: | | | | | |
| ML (1 + 4) | 95 | 124 | 102 | 90 | 98 |
| BR (%) | 67 | 80 | 69 | 66 | 65 |
| Properties after curing: | | | | | |
| EM300/EM100 | 1.2 | 1.1 | 1.2 | 1.3 | 1.3 |
| ΔG* | 5.52 | 5.57 | 3.66 | 1.88 | 2.10 |
| tan(δ)max | 0.335 | 0.333 | 0.304 | 0.251 | 0.248 |

Figure 3:
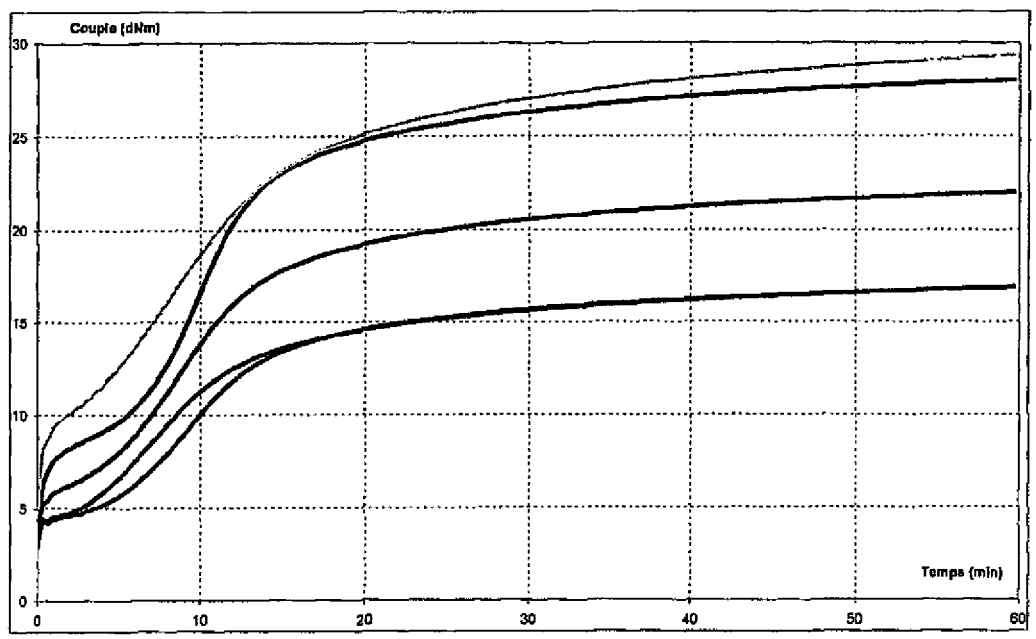

The curves of the rheometric torque as a function of the time, which make it possible to monitor the vulcanization reaction of the various compositions, are reproduced in FIG. 3. These curves are denoted I1, I2, I3, C1 and C2 and they correspond respectively to the compositions I-1, I-2, I-3, C-1 and C-2.

The results in Table 2 show, for the compositions according to the invention I-1, I-2 and I-3, compared with the control compositions C-1 and C-2:

a very similar Mooney viscosity for the compositions C-1, I-1, I-2 and I-3 (the Mooney viscosity of the control composition C-2 has deteriorated), a very similar degree of filler/elastomer coupling for the compositions according to the invention, comparable with that of the control composition C-1 (illustrated by the Bound Rubber BR value), the control composition C-2 having a higher Bound Rubber value, reinforcing properties (EM300/EM100) for the compositions in accordance with the invention I-1, I-2 and I-3 equivalent or improved with respect to those of the control compositions C-1 and C-2, which demonstrates a satisfactory, indeed even improved, level of reinforcement with respect to these control compositions, finally, hysteresis properties (ΔG*, tan(δ)max) which are very significantly improved with respect to the two control compositions, synonymous with a greatly reduced rolling resistance with the compositions in accordance with the invention I-1, I-2 and I-3 with respect to the controls.

Furthermore, the appended FIG. 3 confirms the production of compositions having a comparable rheometry: initiation of the vulcanization reaction at a similar t0 for the various compositions and kinetics which are comparable (corresponding to the slope between t0 and the achievement of the stationary phase of the vulcanization).

It is thus clearly apparent that the compositions in accordance with the invention I-1 and I-2 exhibit greatly improved hysteresis properties with respect to the control compositions, with the other rubber properties, in the raw state and in the cured state, equivalent to those of the controls, which constitutes a very good hysteresis/reinforcing compromise particularly advantageous for a person skilled in the art.

III.4.2 Test 2

The aim of this test is to demonstrate the improved performances of several elastomeric compositions based on HD silica according to the invention, compared with a control composition using a conventional HD silica, for a "Green Tire" tread.

Specifically, this is a matter of backing up the above rubber results during real tests carried out with tires having treads produced respectively from a control composition C-3 using a conventional HD silica (silica A) and from a composition I-4 in accordance with the invention using a silica in accordance with the invention (silica D) which has been prepared according to the preparative method explained in section III.1.3.

The formulation of the compositions C-3 and I-4 is given in Table 3, the levels being expressed in phr, parts per hundred parts by weight of elastomers.

TABLE 3

| | Composition No. | |
|---|---|---|
| | C-3 | I-4 |
| SBR (1) | 72 | 72 |
| BR (2) | 28 | 28 |
| Silica A | 82 | — |
| Silica D | — | 82 |
| Carbon black (3) | 4 | 4 |
| TESPT (4) | 6.56 | 6.21 |
| DPG (5) | 1.54 | 1.79 |
| Antioxidant (6) | 2.0 | 2.0 |
| Antiozone wax (7) | 1.5 | 1.5 |
| Resin (8) | 20 | 20 |
| Oil (9) | 12 | 12 |
| Sulphur | 1.1 | 1.1 |
| Accelerator (10) | 1.9 | 1.9 |

TABLE 3-continued

| | Composition No. | |
|---|---|---|
| | C-3 | I-4 |
| ZnO | 2 | 2 |
| Stearic acid | 1.5 | 1.5 |

(1) SSBR with 58% of 1,2-polybutadiene units and 25% of stirene; Tg = −30° C. 72 phr dry SBR extended with 18% by weight of oil;
(2) BR (with 4.3% of 1,2-; 2.7% of trans-1,4-; 93% of cis-1,4-) (Tg = −103° C.);
(3) Carbon black N234;
(4) TESPT ("Si69" from Degussa);
(5) Diphenylguanidine ("Vulcacit D" from Bayer);
(6) N-(1,3-Dimethylbutyl)-N-phenyl-para-phenylenediamine ("Santoflex 6-PPD" from Flexsys);
(7) Mixture of macro- and microcrystalline antiozone waxes;
(8) THER 9872 resin;
(9) MES/HPD;
(10) N-Cyclohexyl-2-benzothiazolesulphenamide (Flexsys: "Santocure" CBS).

The hysteresis properties measured after curing at 150° C. for 40 minutes are given in the following Table 4.

TABLE 4

| | Composition No. | |
|---|---|---|
| | C-3 | I-4 |
| ΔG* | 6.62 | 2.32 |
| tan(δ)max | 0.366 | 0.267 |

The object of the results obtained in Table 4 is to demonstrate again the very significant improvement in the hysteresis properties obtained with the composition in accordance with the invention I-4 with respect to the control composition C-3.

The compositions C-3 and I-4 are used as treads for radial carcass passenger vehicle tires, with a size of 195/65R15 91H, manufactured conventionally.

The tires thus produced, $T_{(C3)}$ and $T_{(I4)}$, respectively using a tread having the composition C-3 and I-4, are first tested on a test drum in accordance with the rolling resistance test described in section I.3.1 and are then fitted to a Peugeot 406 2L HDI vehicle in order to test their wear resistance, as described in section I.3.2, and their dry and wet grip, as described in section I.3.3.

The performances of the tires produced, $T_{(C3)}$ and $T_{(I4)}$, are given in the following Table 5.

TABLE 5

| Tire: | $T_{(C3)}$ | $T_{(I4)}$ |
|---|---|---|
| Rolling resistance | 100 | 117 |
| Dry grip | 100 | 98 |
| Wet grip | 100 | 107 |
| Wear | 100 | 97 |

It is very clearly apparent that the tire $T_{(I4)}$ in accordance with the invention exhibits, with respect to the control tire $T_{(C3)}$, performances with regard to rolling resistance which are very markedly improved, without deterioration in the dry grip or in the wet grip/wear resistance compromise, which constitutes an astonishing and noteworthy result.

The invention claimed is:

1. A diene rubber composition for tires based on at least (i) one diene elastomer, (ii) one reinforcing inorganic filler and (iii) one coupling agent which provides the bonding between the reinforcing filler and the elastomer, wherein the inorganic filler comprises at least one silica formed of aggregates of primary particles (A) of silica, at the surface of which occur primary particles (B) of silica with a size smaller than that of the primary particles (A), and wherein the at least one silica has:

- a CTAB specific surface ($S_{CTAB}$) and a BET specific surface Area ($S_{BET}$) such that $S_{CTAB}/S_{BET}$ ratio is between 1.1 and 1.4, wherein the $S_{CTAB}$ is between 60 and 400 m²/g,
- a d50 median size of aggregates, measured by XDC particle sizing after ultrasonic deagglomeration, such that:

$d50$ (nm)>(6214/$S_{CTAB}$ (m²/g))+23,

- a pore volume distribution such that:

$V(d5\text{-}d50)/V(d5\text{-}d100)$>0.906−(0.0013×$S_{CTAB}$ (m²/g)),

- a pore size distribution such that:

Mode (nm)>(4166/$S_{CTAB}$ (m²/g))−9.2, and

- the silica exhibits a parameter C, measured by small angle X-ray scattering, such that: $C/S_{CTAB}$ (m²/g)>0.001.

2. The composition according to claim 1, wherein the silica is formed of aggregates of large silica primary particles, at the surface of which occur small silica primary particles, the number median diameter of the large primary particles being at least 12 nm and the number median diameter of the small primary particles being between 2 and 8 nm.

3. The composition according to claim 1, wherein the pore volume distribution of the silica is such that $V_{(d5\text{-}d50)}/V_{(d5\text{-}d100)}$>0.71.

4. The composition according to claim 1, wherein the silica has a CTAB specific surface area of between 80 and 300 m²/g.

5. The composition according to claim 1, wherein the silica has a BET specific surface area of between 60 and 500 m²/g.

6. The composition according to claim 1, wherein the silica exhibits a median diameter, after ultrasonic deagglomeration, of less than 6.0 μm.

7. The composition according to claim 1, comprising another reinforcing inorganic filler.

8. The composition according to claim 1, comprising a reinforcing organic filler.

9. The composition according to claim 7, wherein the level of silica represents from 1 to 99% by weight of the total reinforcing filler.

10. The composition according to claim 9, wherein the level of silica is greater than or equal to 20% by weight of the total reinforcing filler.

11. The composition according to claim 10, wherein the level of silica is greater than or equal to 50% by weight of the total reinforcing filler.

12. The composition according to claim 1, wherein the $S_{BET}/S_{CTAB}$ ratio is between 1.15 and 1.35.

13. The composition according to claim 6, wherein the silica exhibits a median diameter, after ultrasonic deagglomeration, of less than 4.0 μm.

14. The composition according to claim 11, wherein the level of silica is greater than or equal to 80% by weight of the total reinforcing filler.

15. The composition according to claim 4, wherein the silica has a CTAB specific surface area of between 100 and 250 m²/g.

16. The composition according to claim 15, wherein the silica has a CTAB specific surface area of between 130 and 230 m²/g.

17. The composition according to claim 5, wherein the silica has a BET specific surface area of between 90 and 380 m²/g.

18. The composition according to claim 17, wherein the silica has a BET specific surface area of between 130 and 300 m²/g.

* * * * *